United States Patent
Miller et al.

(10) Patent No.: US 6,421,707 B1
(45) Date of Patent: *Jul. 16, 2002

(54) WIRELESS MULTI-MEDIA MESSAGING COMMUNICATIONS METHOD AND APPARATUS

(75) Inventors: Scott Corey Miller, Freehold; Krishan Kumar Sabnani, Westfield; Thomas Yat Chung Woo, Red Bank, all of NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/023,472

(22) Filed: Feb. 13, 1998

(51) Int. Cl.⁷ .................................. G06F 13/00
(52) U.S. Cl. .................. 709/206; 709/219; 709/223; 709/329
(58) Field of Search ................ 709/206, 217, 709/219, 223, 225, 313, 328, 329; 455/466

(56) References Cited

U.S. PATENT DOCUMENTS

| | | | | |
|---|---|---|---|---|
| 5,635,918 A | * | 6/1997 | Tett ........................ | 340/825.52 |
| 5,732,074 A | * | 3/1998 | Spaur et al. ................ | 370/313 |
| 5,742,905 A | * | 4/1998 | Pepe et al. .................. | 455/461 |
| 5,905,777 A | * | 5/1999 | Foladare et al. .......... | 379/90.01 |
| 5,948,066 A | * | 9/1999 | Whalen et al. ............. | 709/229 |
| 5,974,406 A | * | 10/1999 | Bisdikian et al. .............. | 707/1 |
| 5,987,100 A | * | 11/1999 | Fortman et al. ......... | 379/88.14 |
| 6,072,862 A | * | 6/2000 | Srinivasan ............. | 379/100.08 |
| 6,119,167 A | * | 9/2000 | Boyle et al. ................ | 709/234 |
| 6,226,668 B1 | * | 5/2001 | Silverman ................... | 709/204 |

OTHER PUBLICATIONS

AT&T PocketNet(tm) Service Home Page; URL address: http://www.attws.com/nohost/data/pocketnet/pn.html.

* cited by examiner

Primary Examiner—Viet D. Vu
(74) Attorney, Agent, or Firm—Dickstein, Shapiro, Morin & Oshinsky

(57) ABSTRACT

A wireless multimedia messaging communications method and apparatus that permits a subscriber to a wireless telecommunications service to receive and generate multimedia messages from known wireless personal communications devices, i.e., cellular/PCS telephones. A multimedia message may be received by the network and selectively delivered to a subscriber of the wireless service. Upon receipt of the message, the network determines an appropriate action to take with respect to the message based upon a profile of the subscriber. The subscriber is then notified by the network of the message and then delivers the message and any multimedia attachments to the message to the subscriber, according to a delivery indication sent by the subscriber to the network. Advantageously, the method allows for the conversion of messages as appropriate, i.e., text-to-speech, text-to-fax, provides gateways to varieties of multimedia information such as that found on the Internet and provides an active messaging format wherein message templates are stored on a mobile device that interprets the active messages thereby permitting a subscriber to quickly compose a message by supplying simple, dynamic components of the message.

31 Claims, 31 Drawing Sheets

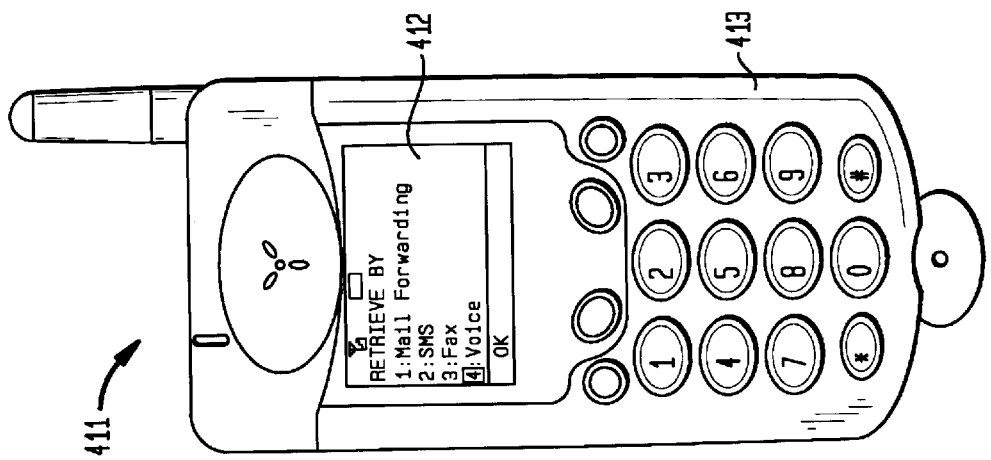
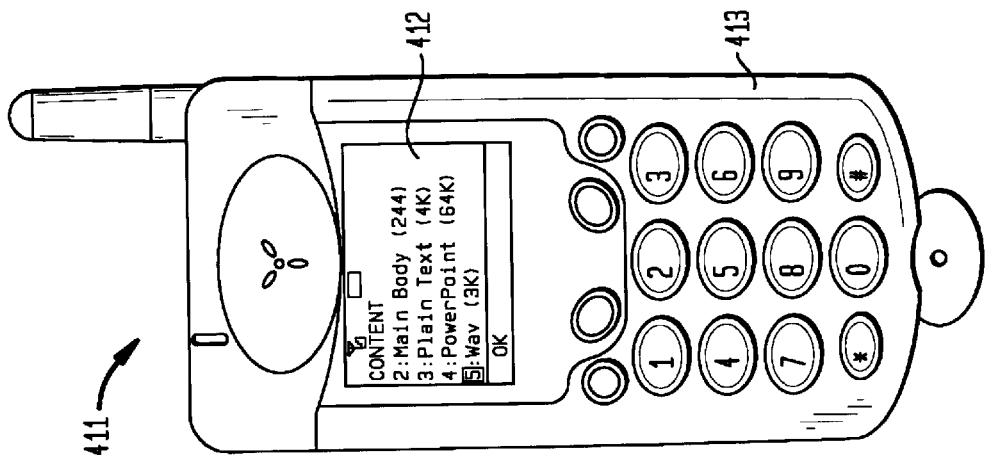

FIG. 5

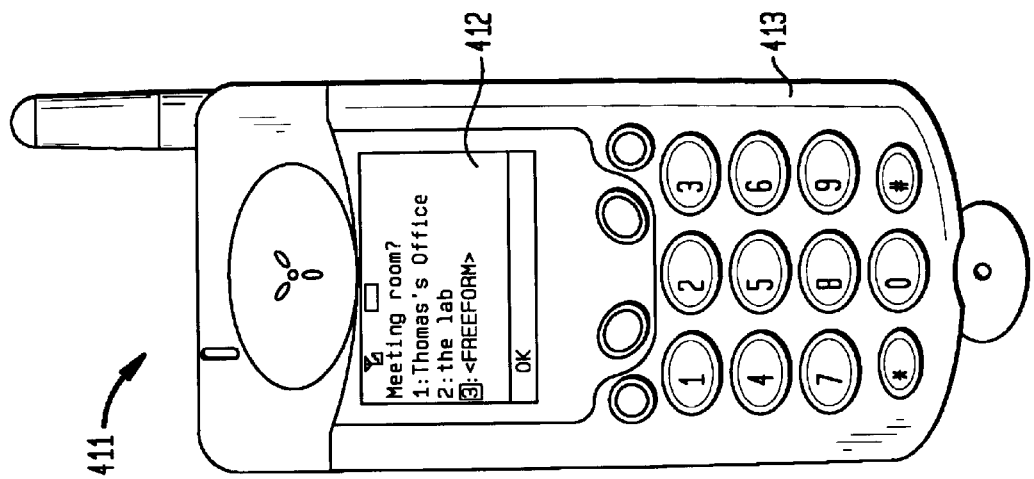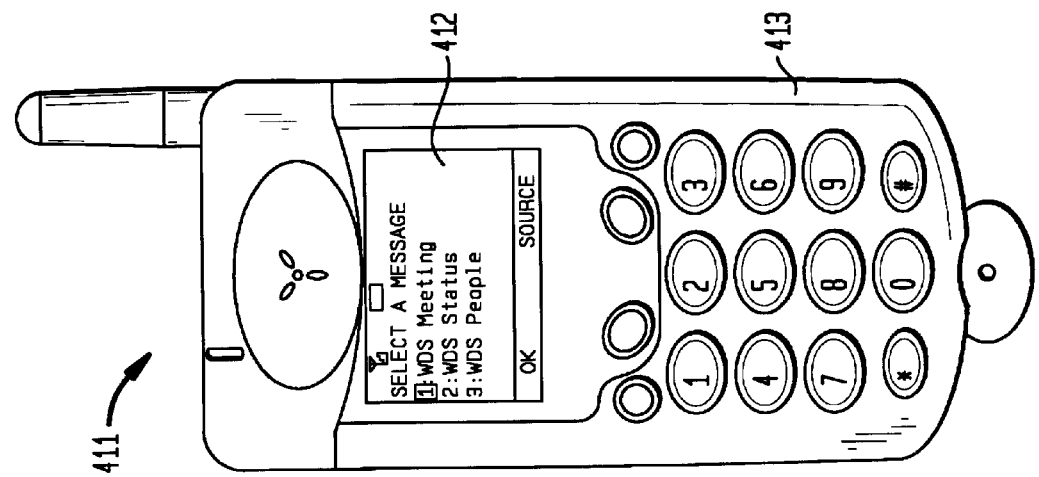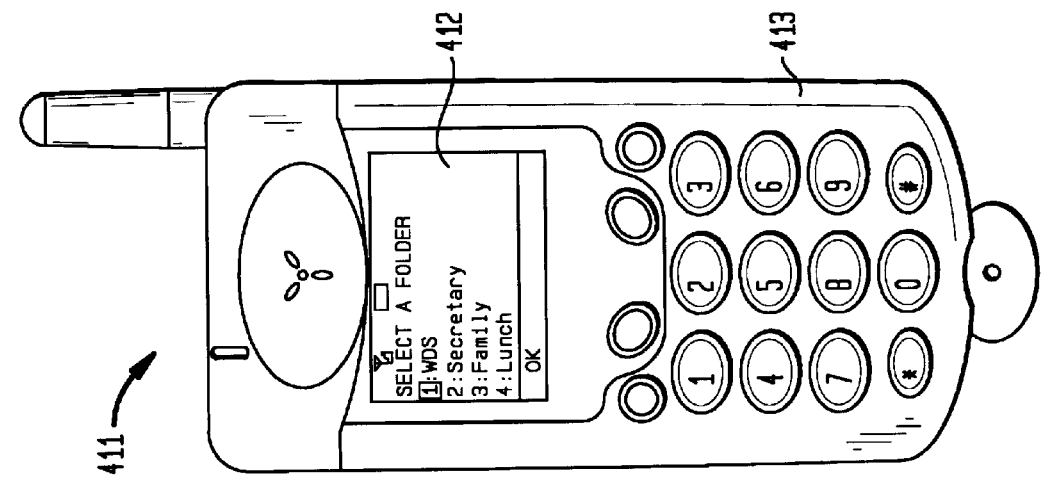

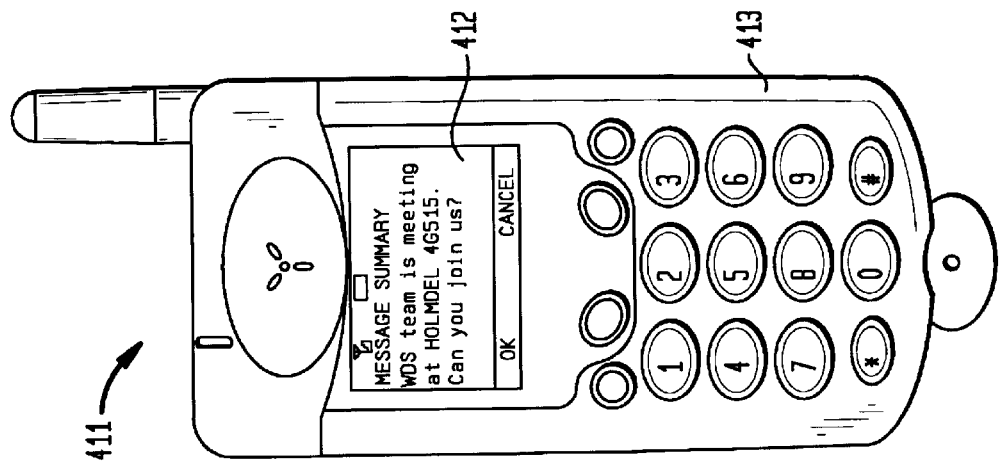
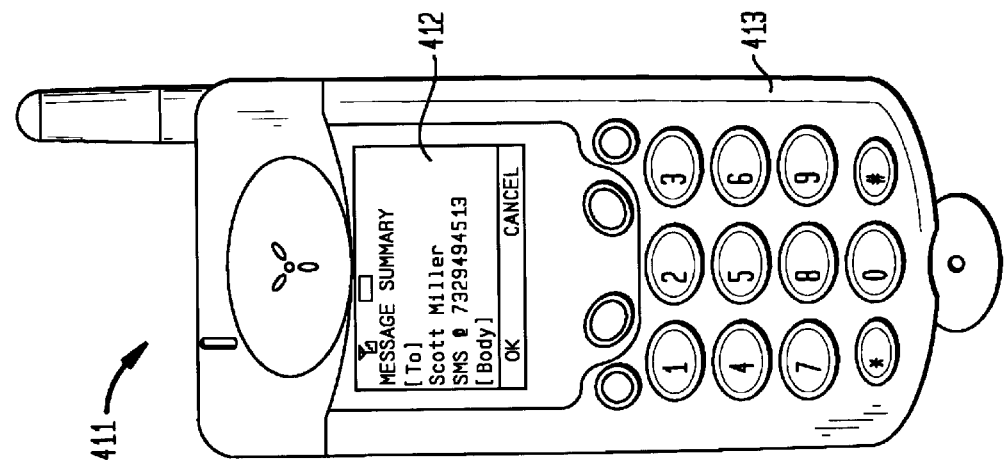
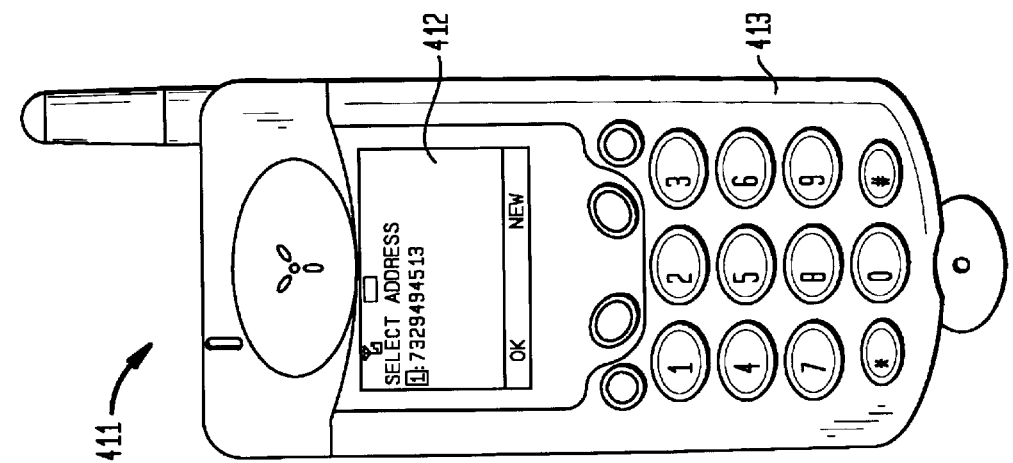

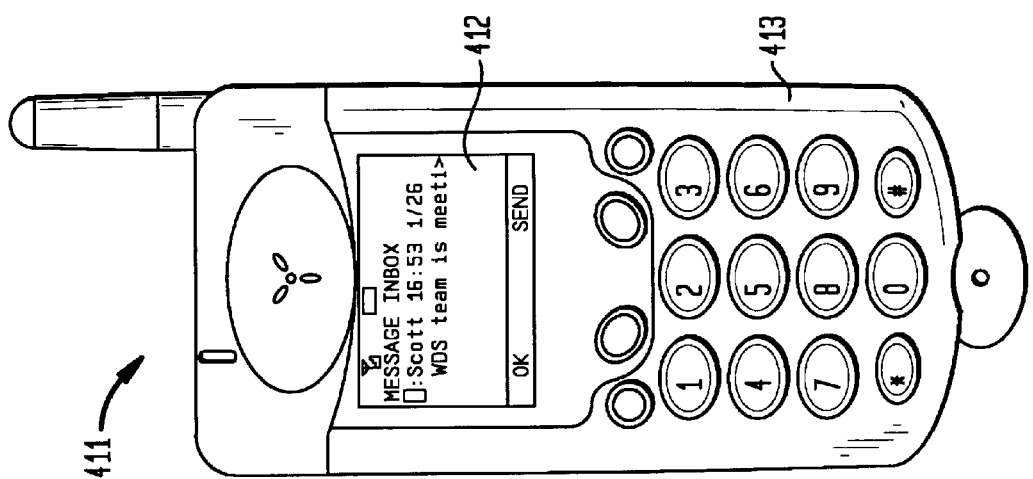
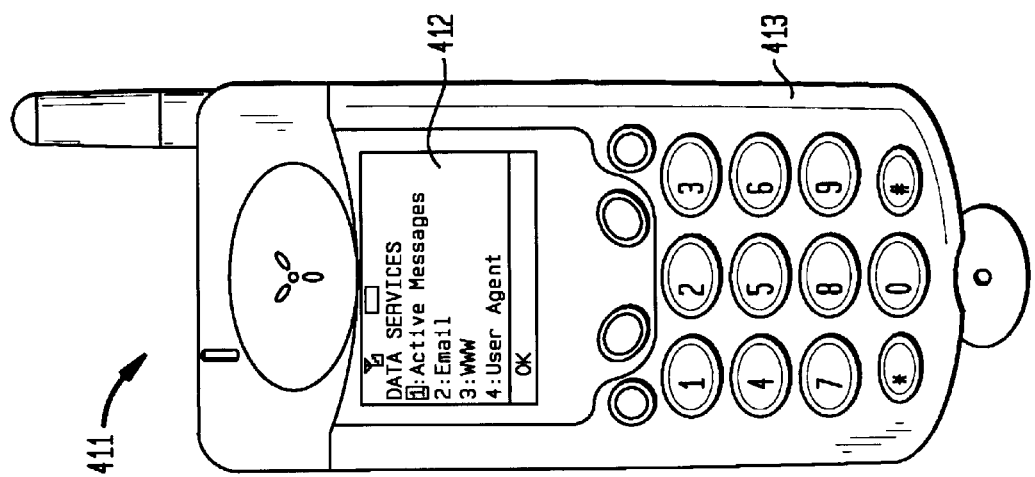
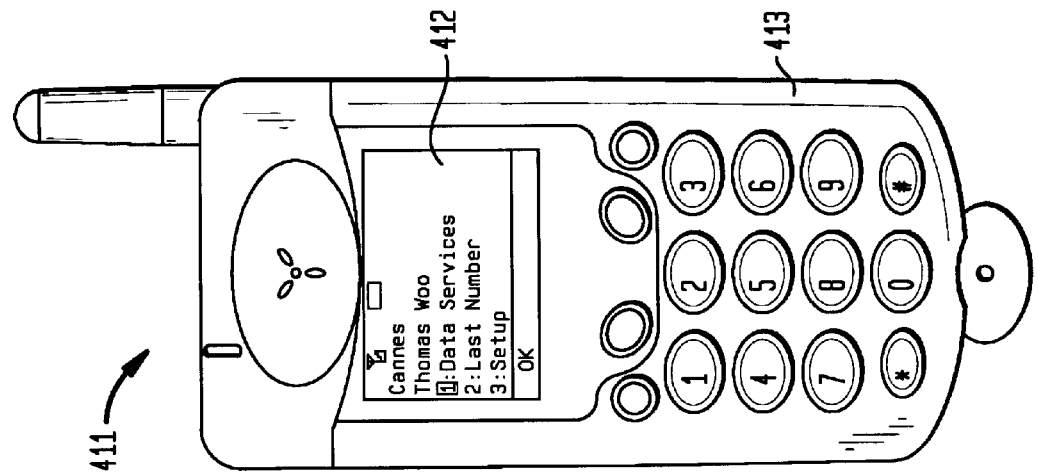

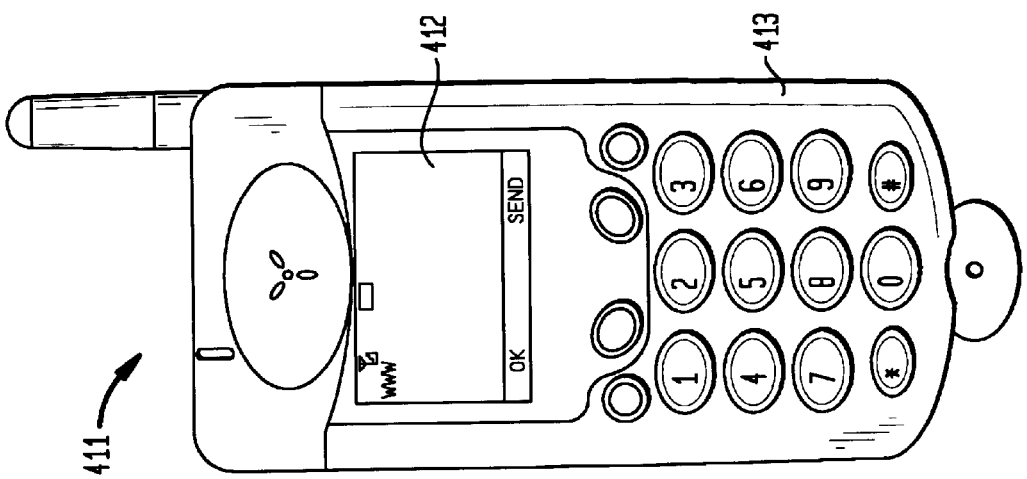
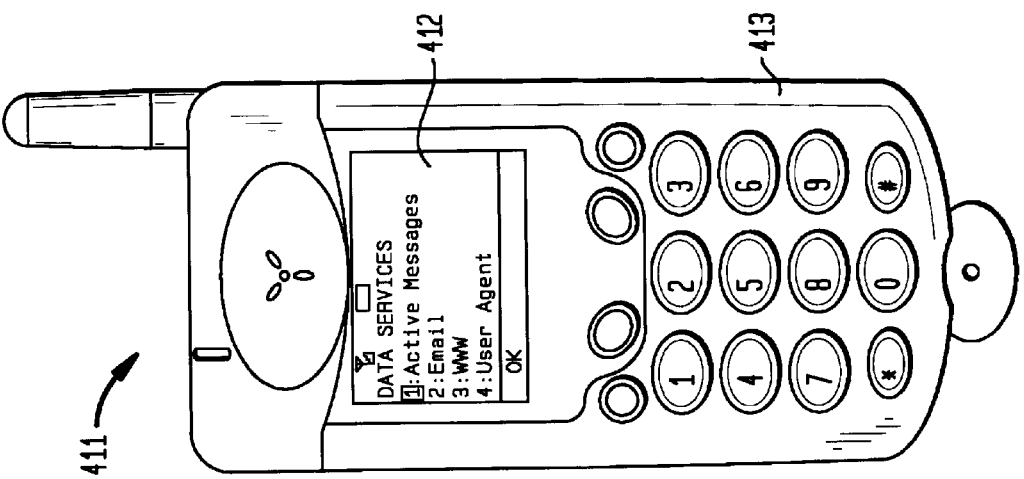
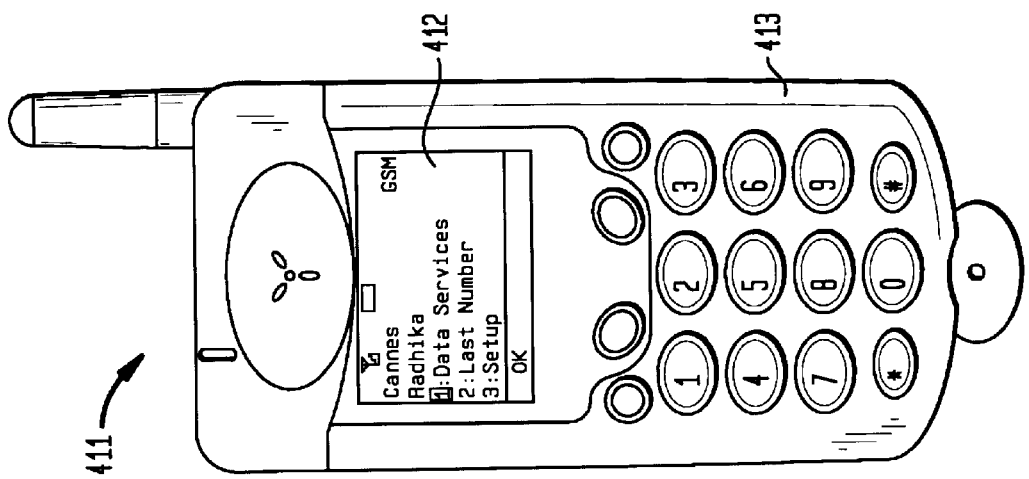

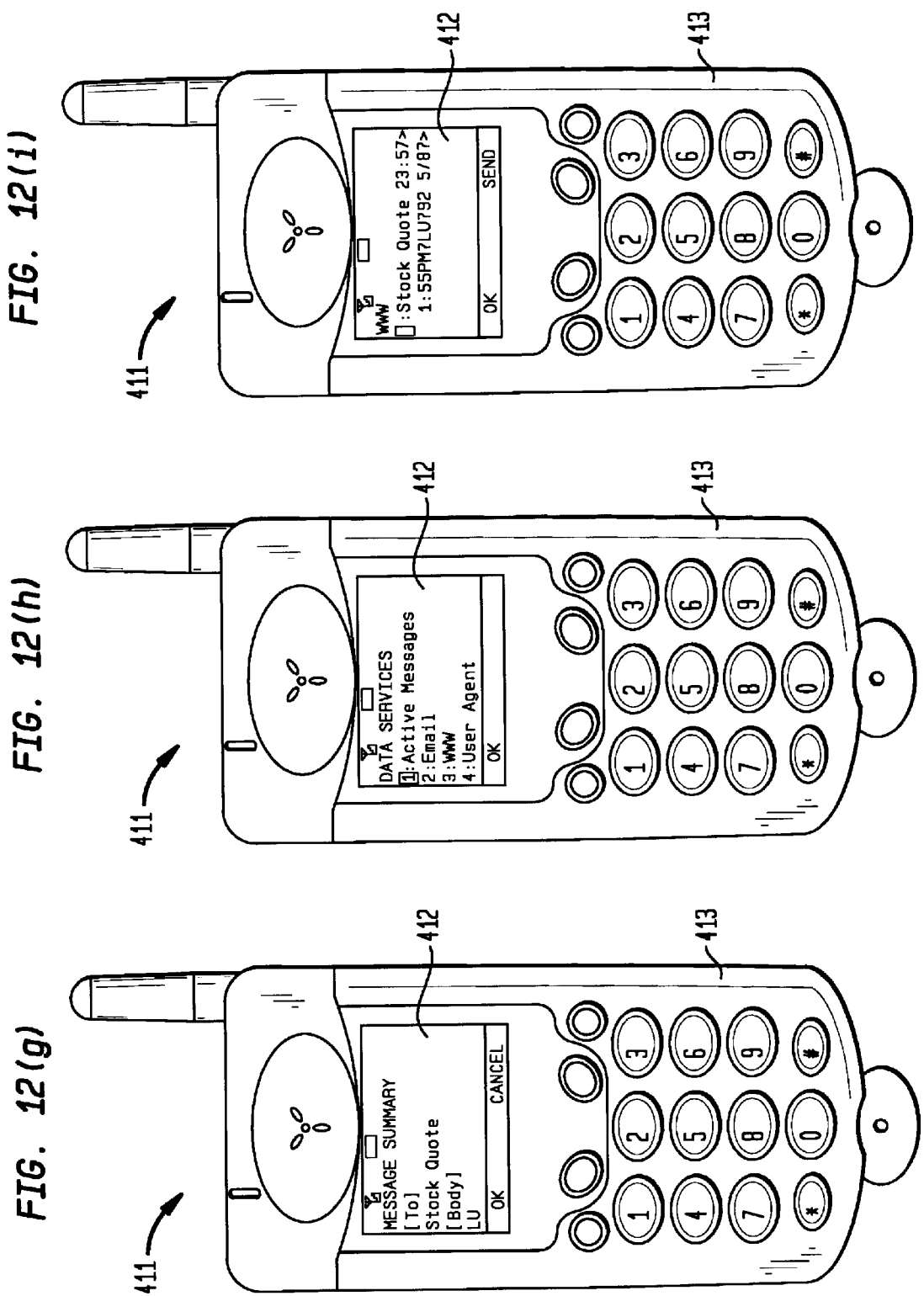

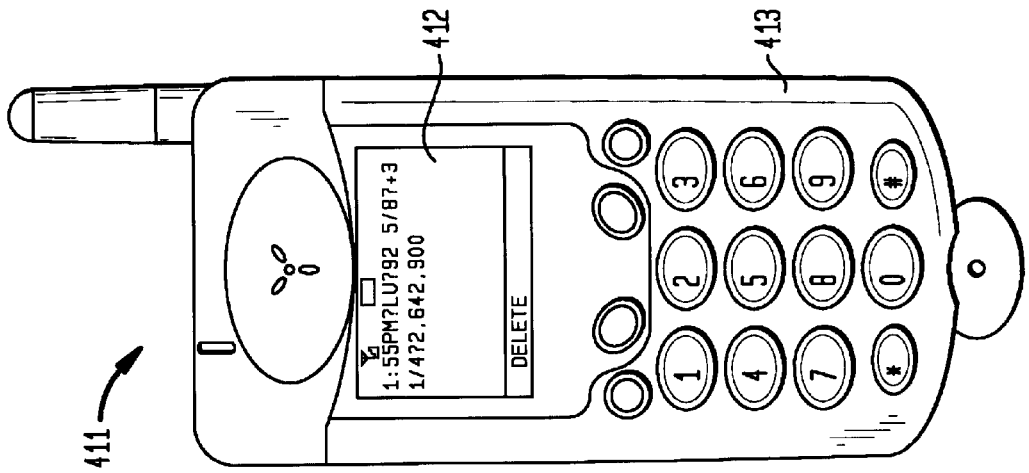
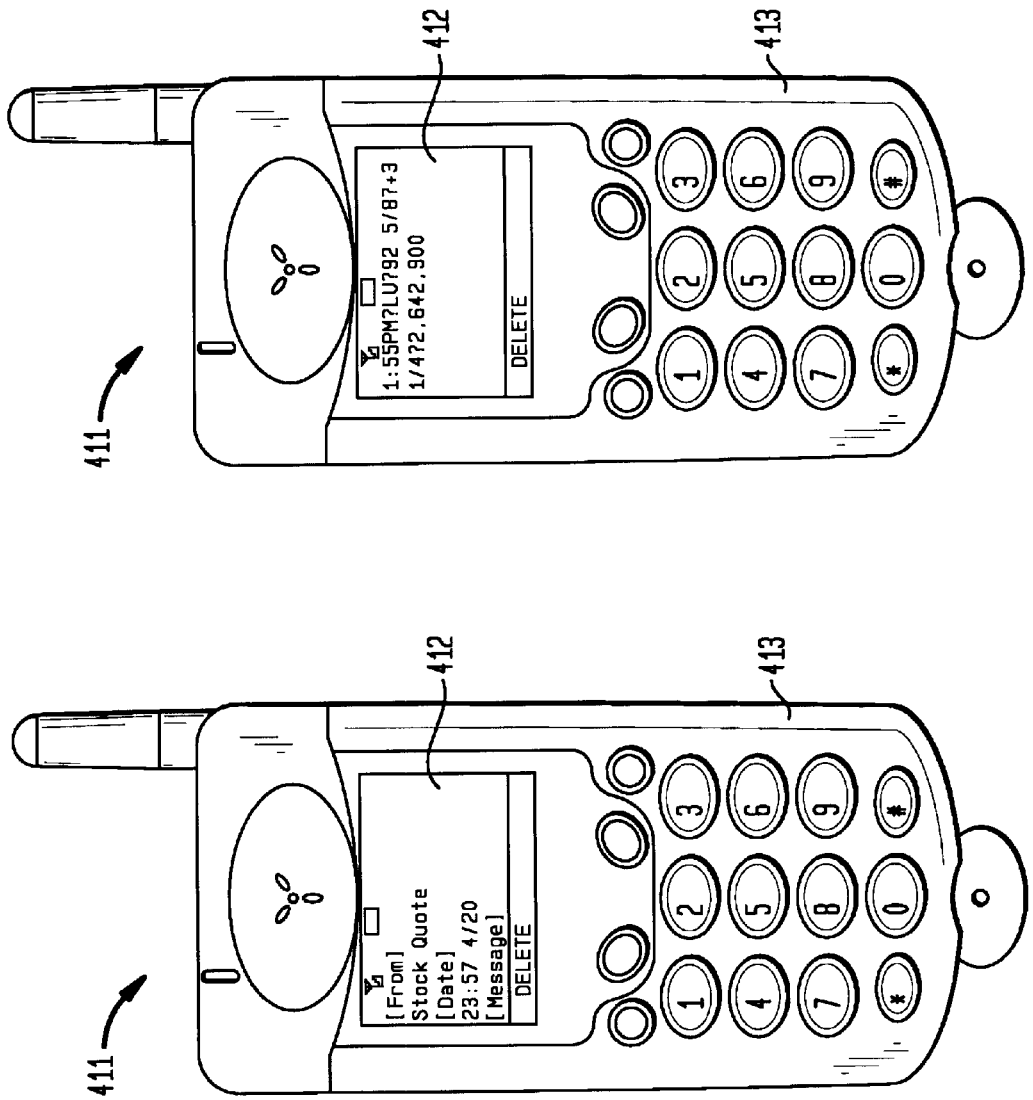

WIRELESS MULTI-MEDIA MESSAGING COMMUNICATIONS METHOD AND APPARATUS

TECHNICAL FIELD

This invention relates generally to the field of telecommunications services and systems and in particular to a wireless multi-media messaging communications method and apparatus.

BACKGROUND OF THE INVENTION

Communications services have become increasingly varied and pervasive in recent years due, in large part, to their great utility and convenience. Their impact on contemporary life cannot be overstated.

One such communications service—the Voice Messaging Service (VMS), is one example of one of these useful communications services. In particular, a VMS receives voice messages when a called party is unavailable. The received message is recorded and a notification, usually a lighted lamp, is given to the called party indicating that a message is present and waiting. Similarly, people have begun to communicate over data networks by sending electronic "mail" or "e-mail" messages to one another. These messages arrive at a called party's host computer and are queued waiting for the called party to request their presentation on the screen of a terminal connected to the host computer.

As can be readily appreciated, these systems are typically specific to a particular type of media, i.e., text or speech, but not both. Given the increasing use of multi-media forms of communication in everyday life, a continuing need exists for communications services and systems that support these multi-media communications (i.e., text, speech, fax, image, video) while at the same time facilitate the mobility of users of these systems and services.

SUMMARY OF THE INVENTION

An advance is made over the prior art in accordance with the principles of the present invention directed to a wireless multimedia messaging communications method and apparatus that provides simple multimedia messaging, active multimedia messaging and mediated world-wide-web access. Advantageously, the present invention permits a subscriber to a wireless communications service to receive and generate multimedia messages from known wireless personal communications devices, i.e., cellular telephones.

Viewed from one aspect, the present invention is directed to a method of providing wireless, multimedia communications service within a telecommunications network whereby a multimedia message may be received by the network and selectively delivered to a subscriber of the wireless service. Upon receipt of the message, the network determines an appropriate action to take with respect to the message based upon a profile of the subscriber. The subscriber is then notified by the network of the message and then delivers the message and any multimedia attachments to the message to the subscriber, according to a delivery indication sent by the subscriber to the network. Advantageously, the method allows for the conversion of messages as appropriate, i.e., text-to-speech, text-to-fax as well as providing gateways to varieties of multimedia information such as that found on the Internet.

Viewed from another aspect, the present invention is directed to an apparatus that supports the delivery of communications services incorporating the method.

Further features and advantages of the present invention, as well as the structure and operation of various embodiments of the present invention are described in detail below with reference to the accompanying drawing.

BRIEF DESCRIPTION OF THE DRAWING

The teachings of the present invention can be readily understood by considering the following detailed description in conjunction with the accompanying drawings, in which:

FIG. 5 is a screen used for creating filtering rules according to the present invention;

FIG. 12(a)–(k) shows world-wide-web access according to the present invention.

DETAILED DESCRIPTION

A preferred embodiment of the invention will now be described while referring to the figures, several of which may be simultaneously referred to during the course of the following description.

Figure 1:
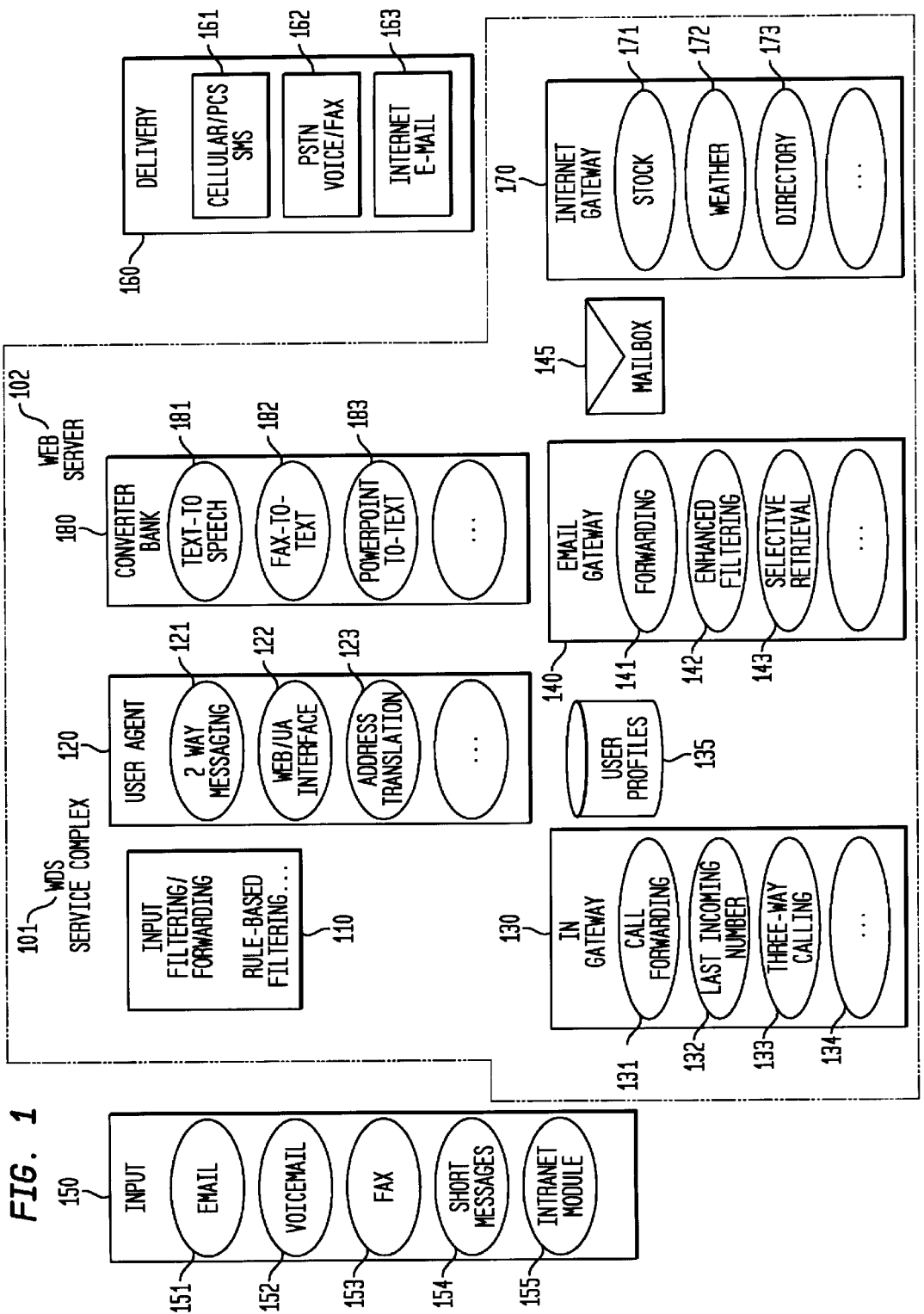
FIG. 1 shows in simplified block diagram form a system and service architecture according to the teachings of the present invention.

With reference to FIG. 1, there is shown the overall system architecture for our wireless, multi-media communications server and associated services. Specifically, and as shown in the figure, are wireless data server (WDS) service complex 101 including input filtering/forwarding subsystem 110, user agent subsystem 120, converter bank subsystem 180, intelligent network (IN) gateway 130, user profile database 135, e-mail gateway 140, mailbox 145, and internet gateway 170. Those skilled in the art will quickly recognize that web server 102, is well-known, and provides standard, world-wide-web (WWW) functions. Input subsystem 150, includes interfaces for a variety of inputs, namely, e-mail 151, voicemail 152, fax 153, short messaging 154 and intranet modules 155. Those skilled in the art will quickly recognize that other inputs are possible as well depending upon the particular application.

Delivery system 160 includes interfaces to a variety of delivery systems including cellular/PCS SMS (Short Messaging Service) 161, public switched telephone network (PSTN) voice/fax 162 and internet or other e-mail 163. The delivery system, as with the input system, is easily extensible to accommodate different output methods and/or technologies.

Input subsystem 150 provides a "universal" input to our service complex 101. Regardless of input format, it first enters input filtering/forwarding subsystem 110 which consults user profile database 135 to determine how particular input is to be processed. Each individual input may be treated individually, as defined by filtering rules. Typical actions include, notification to subscriber(s), forwarding a message, saving a message, and deleting a message.

User agent subsystem 120 is an active entity, dedicated to a particular subscriber. The user agent 120 manages the particular subscriber's profile. For example, a particular subscriber may keep an address book and a set of message templates. The user agent 120 may serve as a translator and provides full addresses for abbreviated addresses. Advantageously, the user agent subsystem reduces the overhead and simplifies the communication between the service complex 101 and the particular subscriber. In this manner, the effective bandwidth between the subscriber and the service complex is more efficiently utilized.

Converter bank subsystem 180 converts an input into an appropriate delivery format prior to its delivery to the subscriber. The delivery format is advantageously specified by the subscriber. For example, a subscriber may choose to retrieve e-mail messages in spoken format. In such a case, the service complex 101 will output the e-mail as spoken text. This is performed by invoking a particular converter, in this case, text-to-speech 181, within the converter bank 180. Alternative output formats, i.e., fax-to-text 182, powerpointe-to-text 183 as well as others are similarly provided.

In Gateway 130, provides known IN functions such as call forwarding 131, last incoming number 132, three-way calling 133, or others, as specified by the subscriber to the service complex 101. Similarly, e-mail gateway 140, and internet gateway 170, provide e-mail and internet functions to users of the service complex 101.

Delivery subsystem 160 handles the actual delivery of output of service complex 101. Importantly, the output need not be a "message" but could simply be notification that a message has been received. As is indicated in the figure, the delivery subsystem 160 can handle a variety of output formats, voice/fax 162, short message 161, and e-mail 163.

Figure 2:
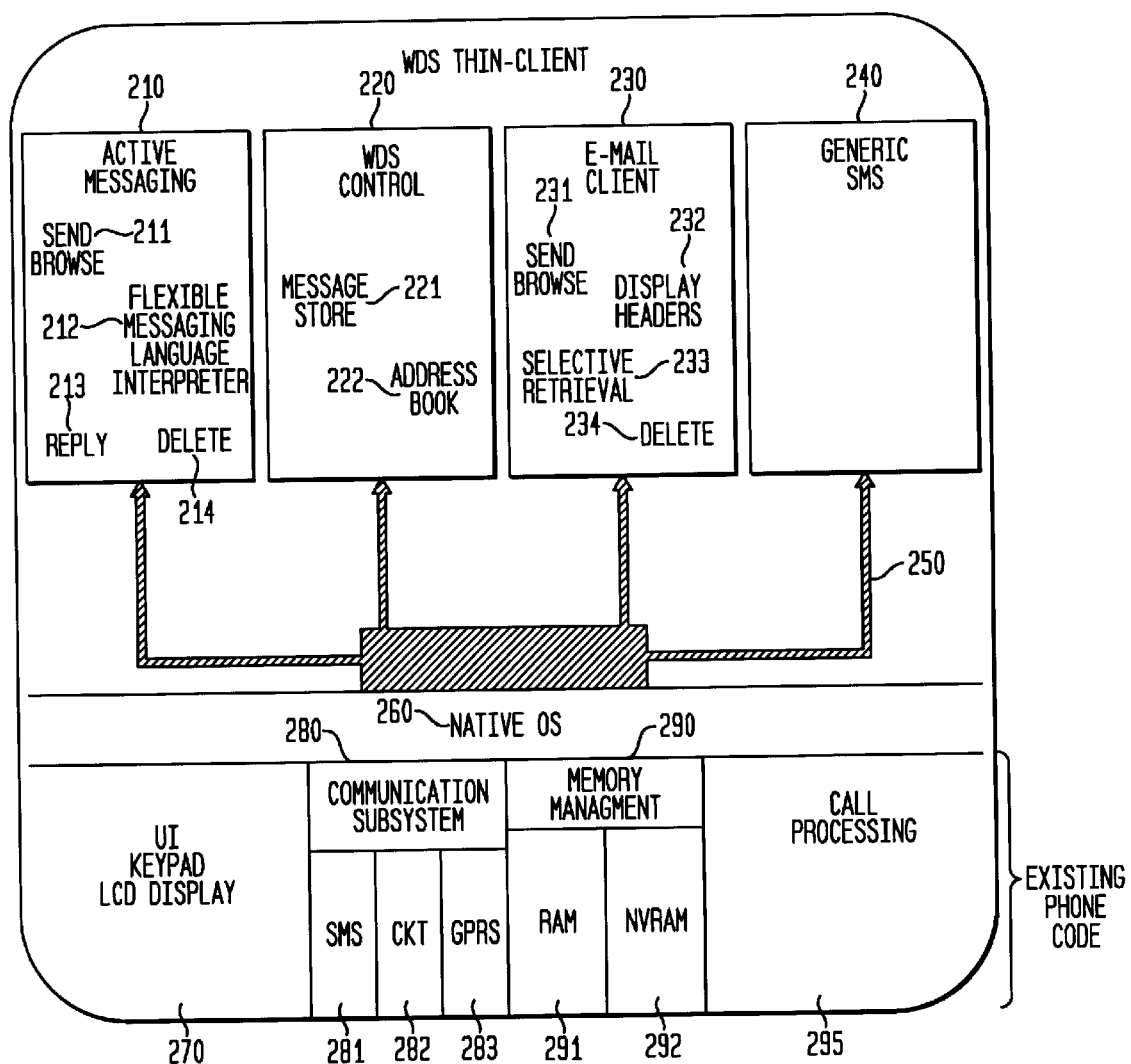
FIG. 2 shows in simplified block diagram form, a thin-client communications device suitable for use with the present invention.

With reference now to FIG. 2, there is shown a block diagram of a thin-client that resides on a subscriber device, i.e., a handheld cellular/PCS handset. It operates in a client/server fashion, wherein the server generally resides in a network. The thin client includes packet dispatcher 250 that separates service-specific messages from "normal", SMS messages. Active messaging module 210 interprets active messages. It maintains an active message box and allows the sending/receiving/reply/deletion of active messages. Control module 220 contains personal message store 221 and personal address book 222. E-mail client module 230 provides standard e-mail functionality. Specifically, it permits the browsing, sending, reply-to and selective retrieval of e-mail messages or their components.

Native OS 260 coordinates communication among the various components within the thin-client. Native OS 260, UI Keypad, LCD Display 270, Communication subsystem 280, memory management 290 and call processing components 295, are generally known and included in cellular/PCS handsets. Communication subsystem 280 provides transport functions, i.e., sends messages into and out of the handset. Such message transport could be, for example, SMS 281, circuit data CKT 282, or packet data such as GPRS (GSM) 283. Memory management 290 interfaces the different types of memory found in the handset, such as random access memory (RAM) 191, or non-volatile RAM (NVRAM) 292. Call processing 295 subsystem, is that module that manages particular calls.

Figure 3:
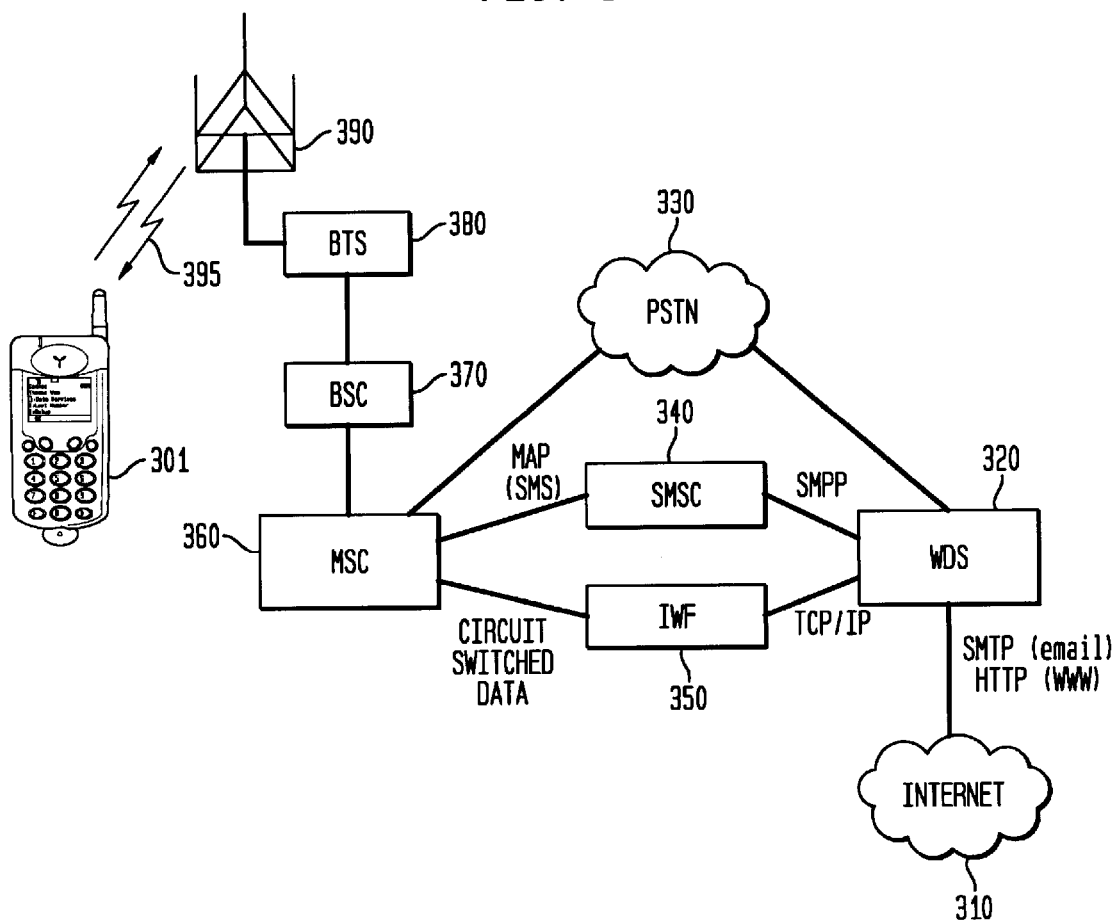
FIG. 3 shows in simplified block diagram form, our inventive teachings applied to a cellular telephony application.

FIG. 3. shows how our inventive method and apparatus integrates into a particular type of cellular/PCS system. Specifically shown in this figure is the integration with the GSM system. Of course, similar coupling could be performed for alternative IS-136, IS-95, etc., systems.

Our inventive data server 320 is shown connected to short messaging service center 340 (SMSC) using known short messaging peer-to-peer (SMPP) protocol. Interworking Function (IWF) 350 is connected to WDS 320 using TCP/IP protocols. WDS is interconnected to public switched telephone network PSTN 330 using standard voice trunks and an Internet 310 via standard protocols, such as simple mail transport protocol (SMTP) for e-mail and hypertext transport protocol (HTTP) for WWW access. The remaining elements, mobile switching center (MSC) 360, base station controller (BSC) 370, base station transceiver (BTS) 380, antenna 390 and handset 301, are all well-known.

Service Scenarios

In order to more fully appreciate the present invention, several service scenarios are now shown.

E-mail Notification and Retrieval Scenarios

In the first of these scenarios, Radhika, sends an e-mail with a number of attachments to Thomas, one of the present inventors, via Thomas' cellular telephone. The sequence of this scenario is shown in FIG. 4(*a*)–(*t*).

With reference now to FIG. 4(*a*), there is shown a screen shot from a known, internet browser 400. Specifically shown in the figure, is a message addressed to "woo@argent.com" 401. The text of the message is shown in the scrollable text window 403.

FIG. 4(*b*) shows generally the same internet browser screen, with three attachments, 404, 405 and 406 in the upper panel. For the purposes of this scenario, and to further demonstrate the flexibility of our present invention, the first attachment 404 is a plain text file, the second attachment 405 is a common graphics file, and the third attachment 406 is a sound file in a common sound format, i.e., .wav format. At this point, those skilled in the art will immediately recognize the unique flexibility afforded by our inventive method and apparatus, namely, the ability to communicate a variety of multi-media formats from an originating communicating party to a receiving party.

An important aspect of our inventive service, is the ability of a receiving party to customize message receipt through the use of a user-specific agent. Advantageously, the agent is set-up through known, WWW protocols and interfaces. FIG. 4(*c*) shows the user-agent customization for our scenarios' recipient, Thomas. As is shown in the figure, subscriber info 407, subscriber quota 408, message header configuration 409 and rules 410 are all identified on the user-agent customization screen. An important distinguishing aspect of the present invention, is the ability for a user (recipient) to define a set of rules that determine how/when messages and their notification are to be treated. Shown in this figure, one filtering rule is defined, namely that SMS notification will be sent to Thomas' handset for every incoming e-mail addressed to Thomas. As is shown and can be readily appreciated, at least two shortcut rules may be established. In the figure as shown, a permanent rule (SMS notification to Thomas' handset) and a vacation rule (e.g., hold messages but notify Thomas at his hotel telephone) are shown as tabbed entries. Other rules, i.e., weekend, weekday, holiday, time of day, sender specific, etc., are easily envisioned and implemented as appropriate.

Turning our attention now to FIG. 4(*d*) there is shown Thomas' handset 411, e.g., a personal communications device which are known and operate according to a number of known protocols. Of particular importance for our present exemplary scenario, is the multi-line display 412 and the keypad 413 which provides for Thomas' output and input, respectively.

Assuming that Radhika had sent the e-mail of FIG. 4(*a*), Thomas will be notified according to the rules he as previously established (or defaulted to, as appropriate) and described in FIG. 4(*c*). When the notification of Radhika's e-mail arrives at Thomas' handset 411, an audible tone (beep) is produced and/or an envelope is displayed in the display 412.

As should now be apparent to those skilled in the art, our inventive method and apparatus is capable of providing a number of data services, i.e., active messaging, e-mail notification and retrieval as well as mediated WWW access. Shown in FIG. 4(*e*), Thomas receives notification that e-mail has arrived that is within his predetermined, rule-based criteria. For this e-mail, Thomas selects "2" on the numeric keypad 413.

With reference now to FIG. 4(*f*), there is shown in the display 412 an indication that e-mail inbox contains e-mail. Also shown on the display is a synopsis of the e-mail. Specifically, the first line shows header information, e.g., sender, date, and size. The ">" indicates that more text follows. The following text can be displayed by pressing the ">>" key. Details of the e-mail may be displayed by pressing "1" on the numeric keypad 413.

FIG. 4(*g*) shows more notification details for the received e-mail. Each line of the e-mail header field is shown on a separate line of the display 412. The body of the e-mail text may be displayed through the action of the keypad 413 and simply scrolling the text down in the display 412. The body of the e-mail is shown in the display 412 of FIG. 4(*h*). The body of the text is shown truncated because only enough text to fill up a single SMS packet has been transported to the handset 411. In this manner, the bandwidth between the handset 411 and the rest of the cellular system is conserved. If Thomas presses the "content" soft-key, the details of each attachment to the e-mail will be displayed on the display 412.

With reference now to FIG. 4(*i*), there is shown the result of pressing the content softkey. Specifically, the content screen of the display 412 shows the type and size of each attachment in the e-mail. As shown, lines 1 and 2 of the display refer to the entire email and the main body of the e-mail, respectively. Line 3 and on shows the type and size of each attachment.

Advantageously, Thomas can now specify which part of the e-mail he wishes to retrieve by first selecting that part through the use of the keypad 413. Next, as shown in FIG. 4(*j*), he specifies a retrieval method, i.e., SMS, fax, voice, etc. Depending upon the retrieval method selected, the service complex (101 in FIG. 1) invokes the appropriate converter contained in the converter bank (180 in FIG. 1) to process the e-mail and deliver the final result in chosen format.

In this instance, Thomas chooses to receive more of the main body using SMS. That is, more of the main body will be sent to the handset 411 as text. FIG. 4(*k*) shows that the handset has received more of the main body of the e-mail text that is displayed in the display 412. If, as shown in FIG. 4(*l*), Thomas desires to see more of the e-mail, he can use the keypad 413 and scroll down through the displayed text. As was noted previously, the text is truncated because only one SMS amount of text for each request is transmitted. Advantageously, the number of SMS messages used for transmitting the reply is customizable by the subscriber.

If Thomas desired to retrieve more of the component parts of the e-mail, he could for example, chose to retrieve the plain text attachment as shown in FIG. 4(*m*). As can be seen in the display 412, the plain text attachment is 4K long. Advantageously, Thomas can elect to have that part of the e-mail "read" to him by the system instead. As shown in FIG. 4(*n*), Thomas selects the retrieval method as "voice". Next, as shown in FIG. 4(*o*), Thomas provides a telephone number to which a call will be placed by the service complex 101 and the message subsequently read. In this case, Thomas uses the keypad 412 to enter the appropriate destination number (the default being the handset 411 itself). Upon receiving Thomas' request, the service complex 101 will invoke the text-to-speech converter 181 contained in the converter bank 180, and convert the e-mail message to speech for transmission to the handset 411.

As you may recall, there were other parts of the original e-mail message that Thomas received, and in particular, a graphics file. With reference now to FIG. 4(*p*), Thomas can select that part of the e-mail message as well through the numeric keypad 413. Then, as shown in FIG. 4(*q*), he selects an appropriate retrieval method, in this case facsimile. Finally, as shown in FIG. 4(*r*), Thomas enters a destination fax # to which the graphics file is to be sent in facsimile format. Upon transmission of the specified number, the service complex 101 sends the attachment to the appropriate converter in the converter bank 180, and then transmitted via appropriate delivery subsystem 160.

Lastly, note that the original e-mail message contained an audio attachment included in a known, standard (.WAV) format. Similarly, and as shown in FIG. 4(*s*), Thomas can select the .WAV attachment, choose voice output FIG. 4(*t*), and have the .WAV attachment played for his listening.

Figure 5:
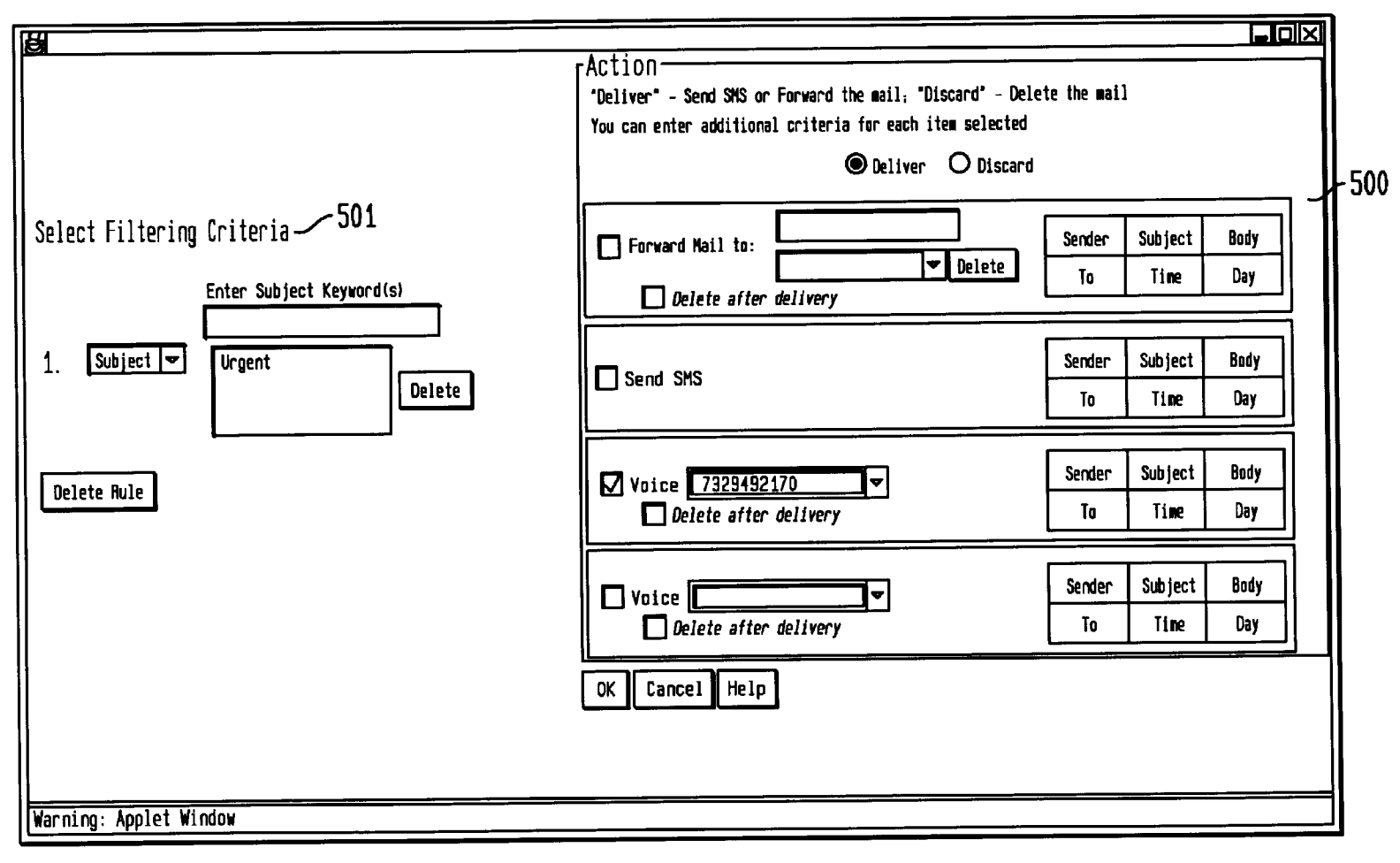

As can be readily appreciated, the present invention is particularly flexible, and allows the selective retrieval and formatting of messages sent to a mobile subscriber. Additional flexibility is demonstrated in FIG. 5, which is a screen image depicting the creating of a new filtering rule. Advantageously, the use of rules allows a subscriber such as Thomas to determine how individual or groups of messages are handled, depending upon characteristics of the messages themselves. For example, suppose that Thomas desired voice notification of any message that a sender marked as "urgent". As is shown in FIG. 5, filtering criteria is specified for the subject field of the message. In this example, when a message is received which contains the keyword "urgent" in the subject field, that message is delivered via voice to a specified telephone number. Alternatively/additionally, the message may be forwarded, or sent as SMS or faxed to a desired number as well.

Active Messaging Scenario

Additional flexibility is possible according to the present invention through the use of active messages. Active messages may be viewed as simple programs that are interpreted and executed at the handset. For example, consider the following active message:

```
<AM NAME="WDS Meeting">
    WDS team is meeting at
        <CHOICE PROMPT="Meeting Room?">
            <CI> Thomas' Office
            <CI> the lab
            <CI> <FREEFORM>
        </CHOICE>
    Can You Join Us?
        <REPLY>
            <CHOICE PROMPT="Can You Join Us?">
                <CI> Yes, at <TIME>
                <CI> No, can't make it
                <CI> Call me at <PHONENO>
            </CHOICE>
        </REPLY>
</AM>
```

As can be readily observed upon inspection of this active message, the format of the active message is well-structured, wherein different components of the message are identified by particular identifiers or tags. Specifically, the body of the active message is identified by the "<AM NAME>" tag which identifies the beginning of the active message. Similarly, the "</AM>" tag delineates the end of the active message.

Another component of the active message of interest is the "<CHOICE>" tag which identifies a prompt to be transmitted to the recipient of the message. Specifically, the <CHOICE> is followed by three choice items, namely, "<CI> Thomas' Office", "<CI>the lab", and "<CI> <FREEFORM>". When this component of the active message is interpreted by the handset, it will display the prompt "Meeting Room?" followed by three choice items, one of which will be selected by the subscriber. In this example, the three possible responses to the prompt which queries for the meeting room are: "Thomas' Office", "the lab", or "<FREEFORM>", which permits the recipient to specify an alternative location using the handset keypad.

Figure 6C:
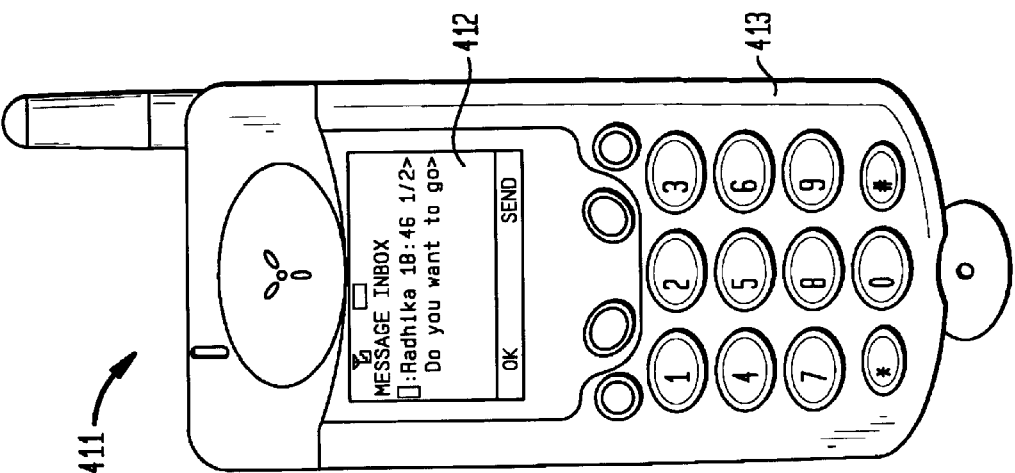
FIG. 6(a)–(z) shows an active messaging service scenario according to the present invention.
Figure 6B:
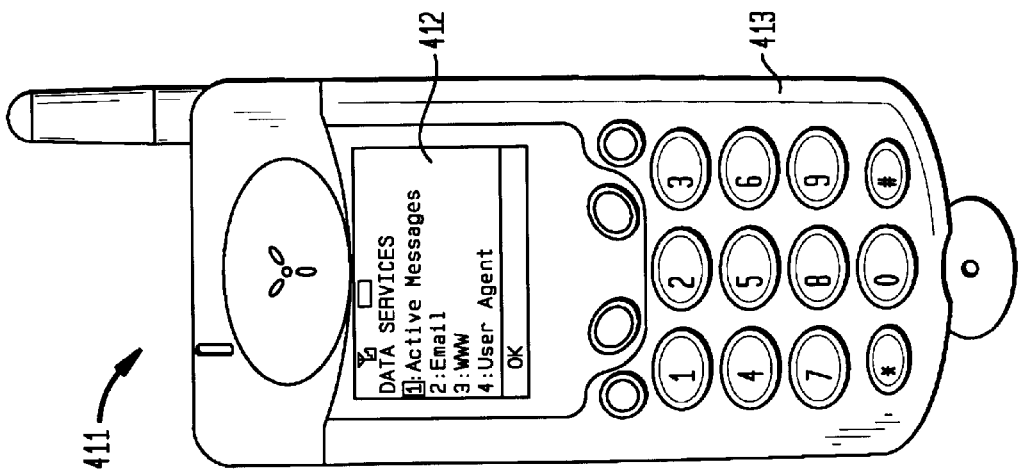
Figure 6A:
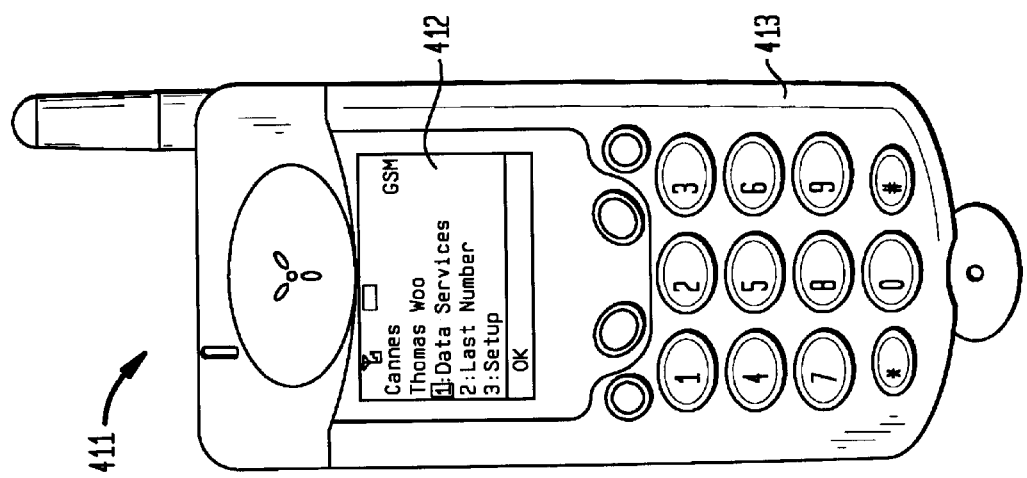

With reference now to FIG. 6(a) there is again shown handset 411 with display 412 and keypad 413. To send a new active message, Thomas (our hypothetical user) selects data services from the itemized display. Next, as shown in FIG. 6(b), Thomas selects Active Messages. In response to this selection, and as shown in FIG. 6(c), the message inbox is displayed showing all of the active messages that were sent to Thomas' handset. To send a new active message, Thomas presses the SEND softkey, on the numeric keypad 413.

In a preferred embodiment of the present invention, active messages may be stored both in the handset itself, as well as in the service complex (101 of FIG. 1). As is shown in FIG. 6(d), the active messages may be advantageously group into folders for added organizational convenience. In this example shown, Thomas selects the WDS folder.

Each folder may contain any number of active messages. With reference now to FIG. 6(e), there it shows three active messages within the WDS folder selected by Thomas. Each message is usually given a meaningful name using the NAME parameter in the AM tag at the time it is created so that a review of the actual message is unnecessary. Thomas can always view the actual message text that is coded in the active messaging language and format shown previously if he desires by selecting the SOURCE softkey. Here, Thomas chooses the WDS meeting active message.

As can be appreciated, and with reference now to FIG. 6(f), the handset contains an interpreter for the active messaging language that specifies the particular active message. Consequently, when an active message is selected, the interpreter within the handset processes the message, component by component. Recall that the first component of the active message is a CHOICE component with three choice items. Thomas can select any one of the three choices. Here, Thomas selects the <FREEFORM> choice.

This <FREEFORM> selection results in a freeform text entry screen being displayed in the handset display window. Shown in FIG. 6(g), the freeform text entry screen permits the entry of any text using the keypad. After all of the desired freeform text is entered, Thomas may press the DONE softkey to transmit the freeform text response. Since there is no more active messaging components to process this finishes message customization. Next, and as shown in FIG. 6(h), Thomas must select a recipient to whom he will send this message. An address book that is stored in either the handset or the service complex is displayed. For this example, Thomas chooses a new recipient, Scott.

Figure 6I:
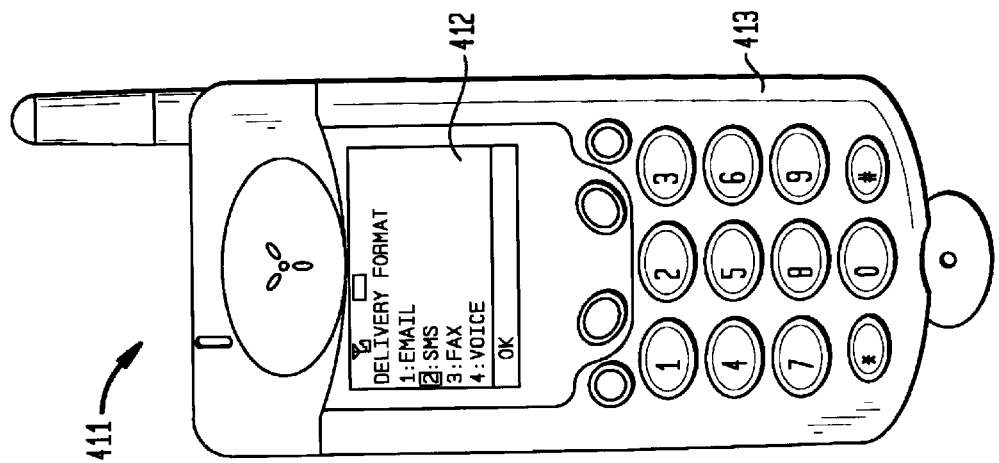
Figure 6H:
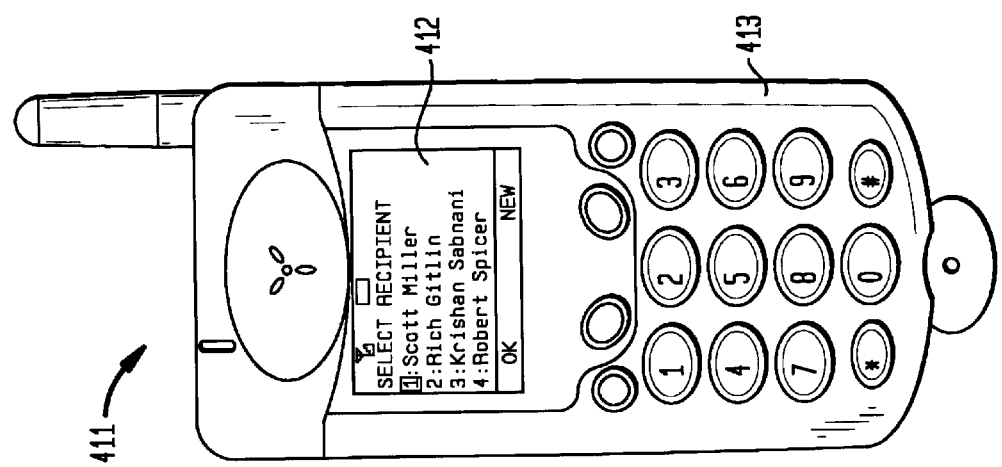
Figure 6G:
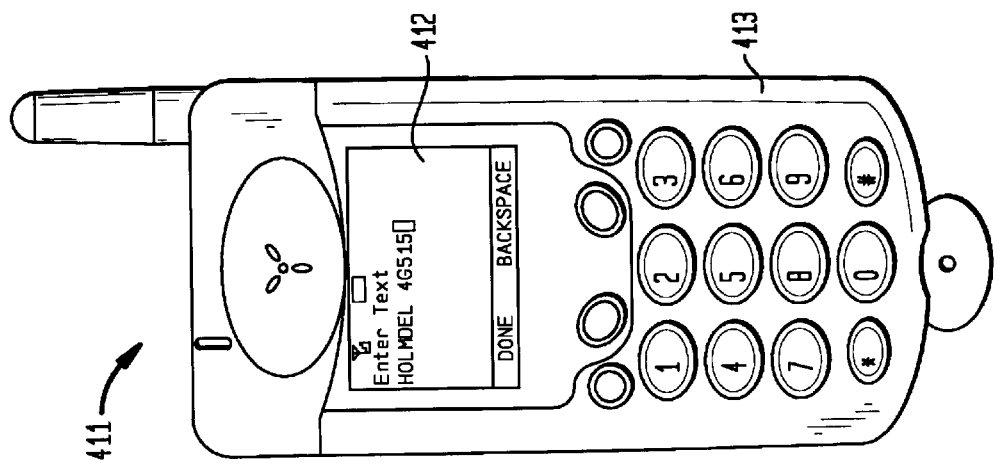

Now, and as shown in FIG. 6(i), Thomas needs to define a delivery method for this active message. Similar to e-mail notification, our inventive method and apparatus allows an active message to be delivered in multiple formats. Here, Thomas selects SMS. That is, the message will be delivered to Scott's handset as an SMS message. After a confirmation of Scott's handset number (FIG. 6(j)), a summary of the customized message to be sent to Scott is shown in FIG. 6(k). As can be seen, it confirms that the message is to be sent to Scott using the number shown previously. Using the numeric keypad, Thomas can scroll down through the body of the message as shown in FIG. 6(l). As one would expect now, the message is fully customized and the variable/user defined portions of the active message are now defined. Thomas confirms the message and sends it by pressing the OK softkey.

Figure 6M:
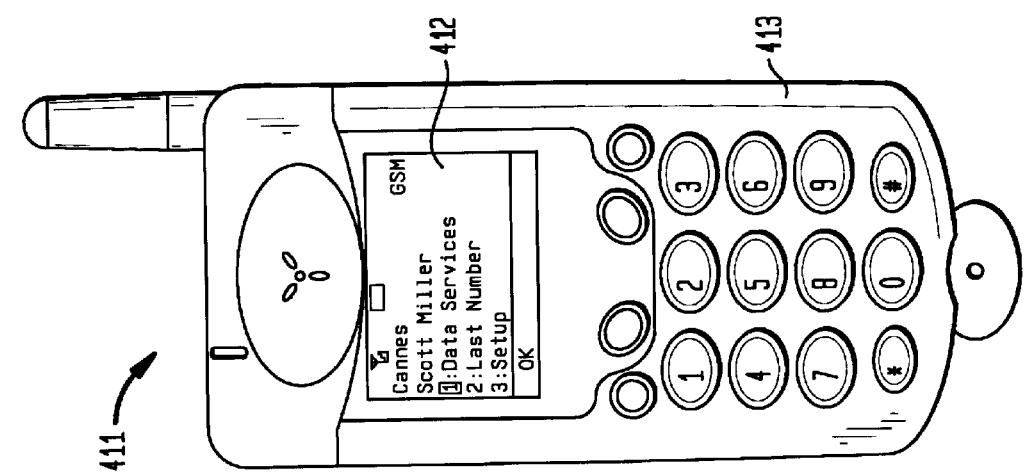
Figure 6N:
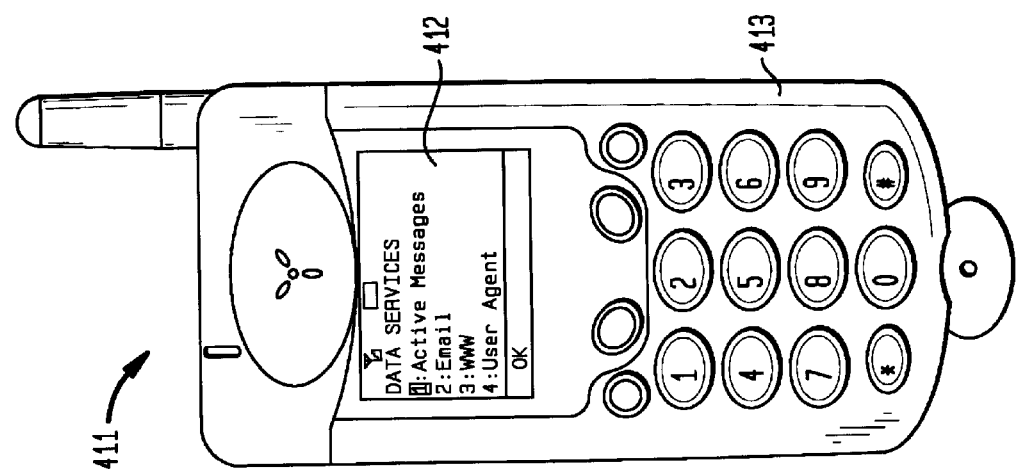
Figure 6O:
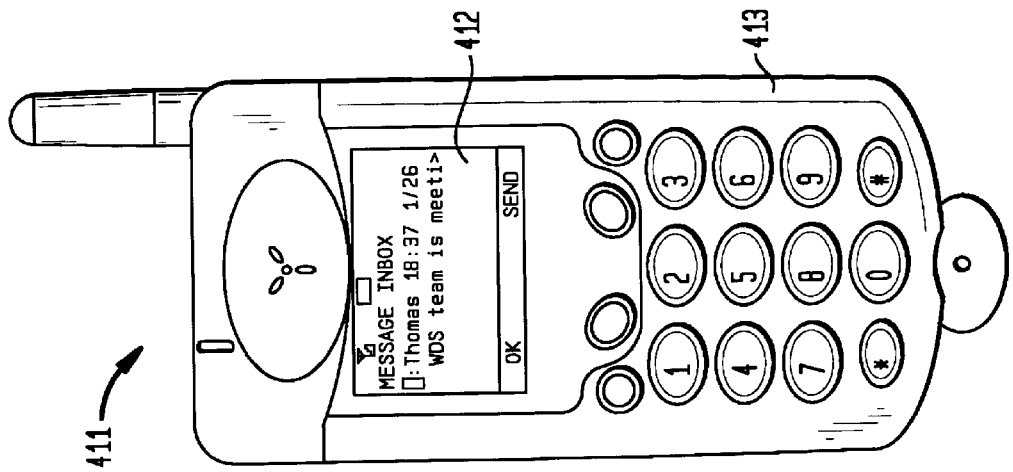
Figure 6R:
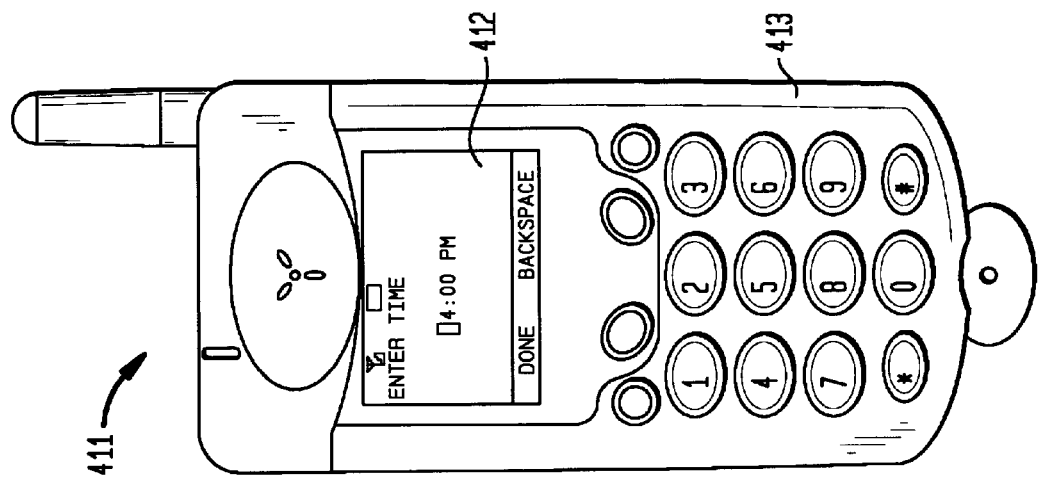

Turning our attention now to FIG. 6(m), there it shows Scott's handset. The handset provides an audible beep when Thomas' active message arrives. As shown in FIG. 6(n), Scott selects active messages to browse the active messages that he has received. FIG. 6(o) shows Scott's active message inbox. The newly received active message from Thomas is shown. To look at the detail of the messages, Scott simply presses the number 1 on the numeric keypad or the OK softkey. FIG. 6(p) shows the body of the message sent by Thomas. To reply, Scott presses the REPLY softkey.

Figure 6Q:
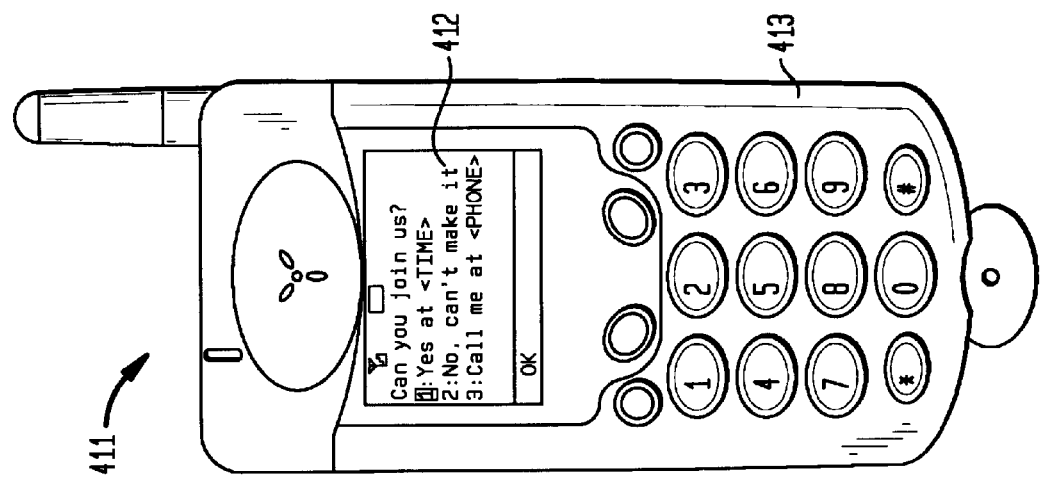
Figure 6P:
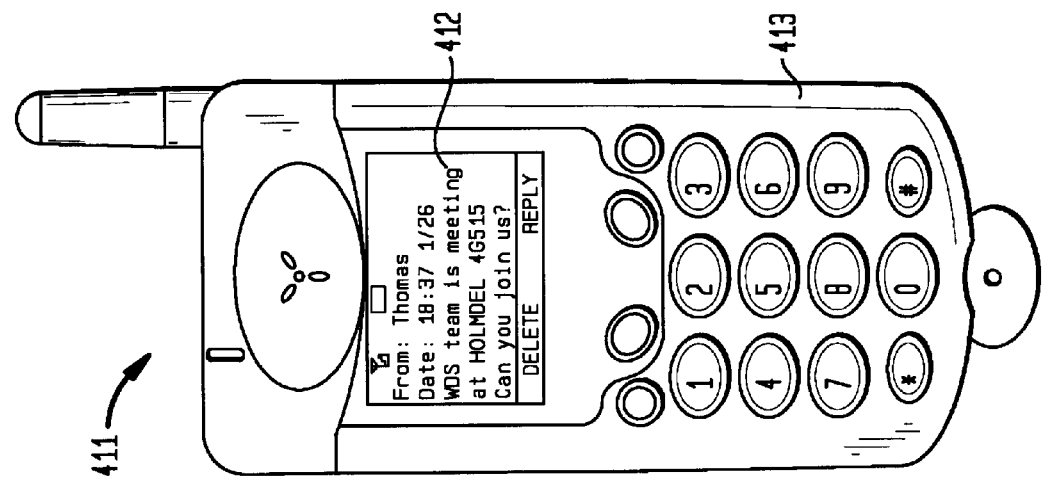

At this point, and as shown in FIG. 6(q), once Scott presses the REPLY softkey, the processing of the REPLY component of the active message begins. Recall that a CHOICE component was part of the REPLY. Consequently, Scott selects the first choice of the choice item list using the numeric keypad. Importantly, this choice required an additional argument, namely a <TIME> component. Scott now enters a time for the REPLY. This is shown pictorially in FIG. 6(r).

Figure 6U:
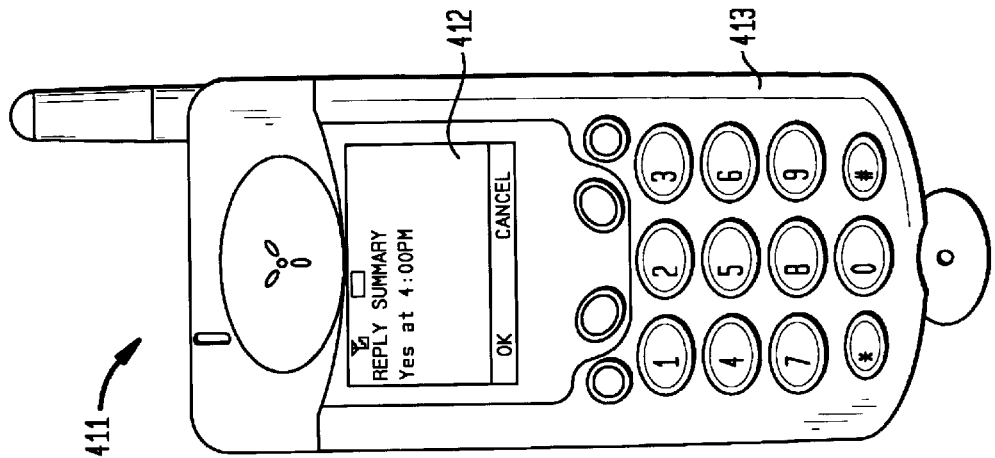
Figure 6T:
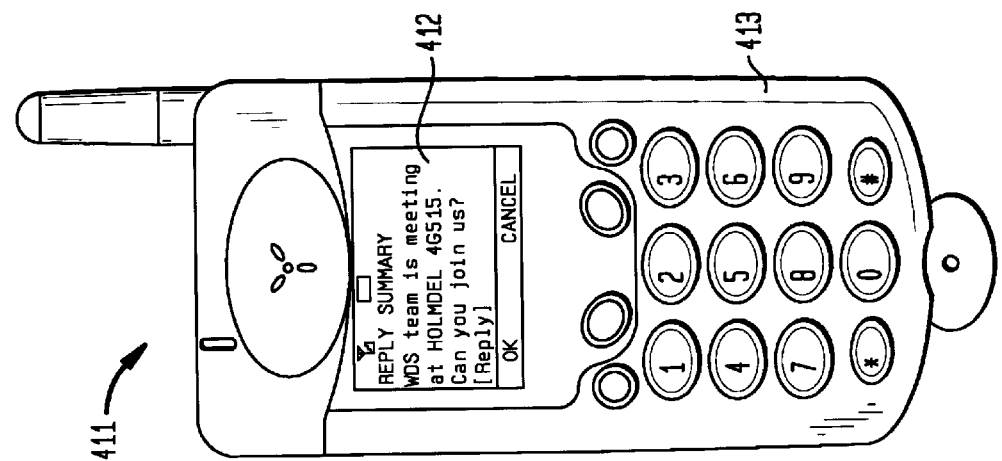
Figure 6S:
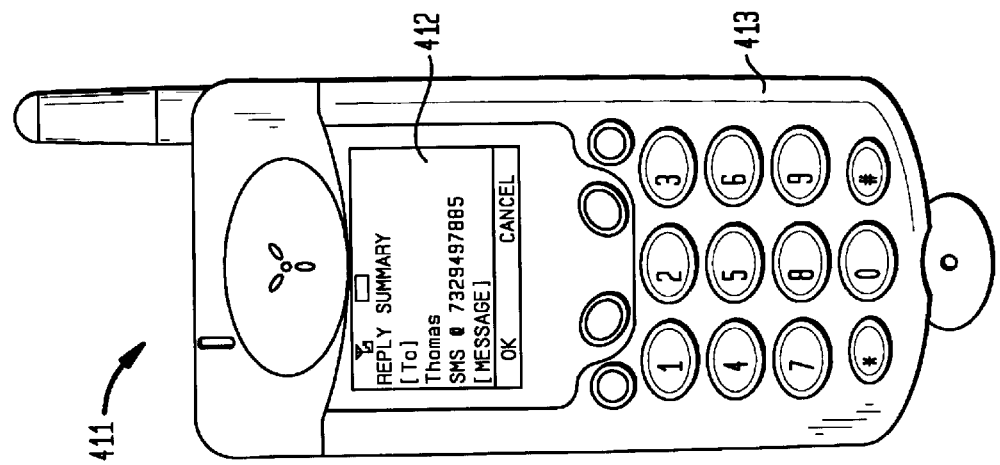

At this point, the REPLY to Thomas' active message is fully customized. FIG. 6(s) shows a summary of the reply. The first two lines of the display show who the reply is being sent to. Scrolling down the display, as shown in FIG. 6(t), exposes the text of the original message. Continued scrolling, as shown in FIG. 6(u), shows the reply. Scott now send the reply by depressing the OK softkey.

Figure 6Z:
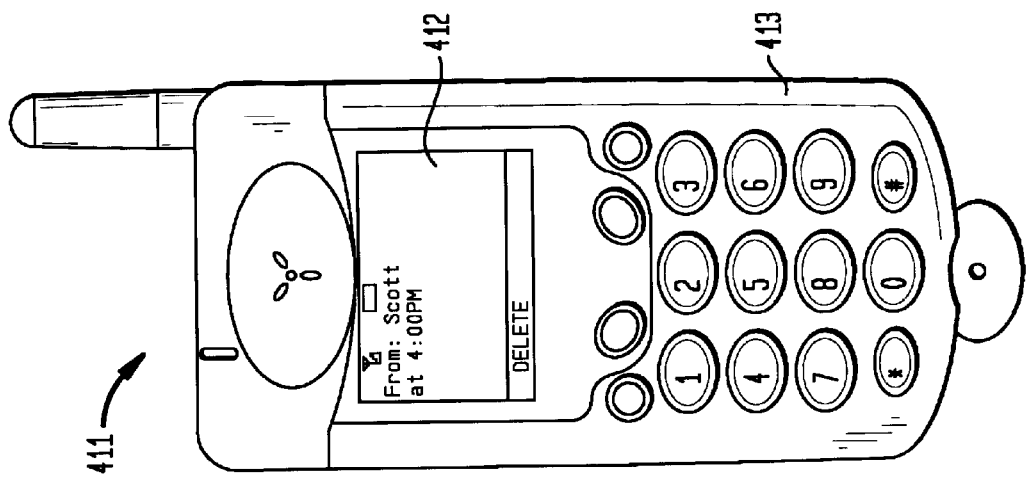
Figure 6Y:
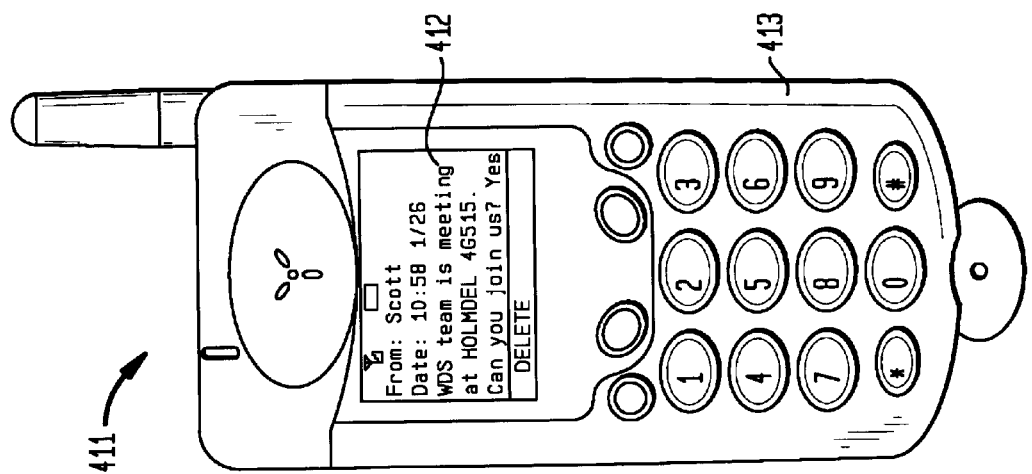

Now, with reference to FIG. 6(v), Thomas' handset beeps upon receipt of Scott's reply. Thomas chooses active messages to view the active message inbox (FIG. 6(w)). FIG. 6(x) shows Scott's reply, as expected. It first shows the original active message sent by Thomas. (FIG. 6(y)) Scrolling down in the display, FIG. 6(z), shows the rest of the reply.

World-Wide-Web Access Scenario

Figure 4A:
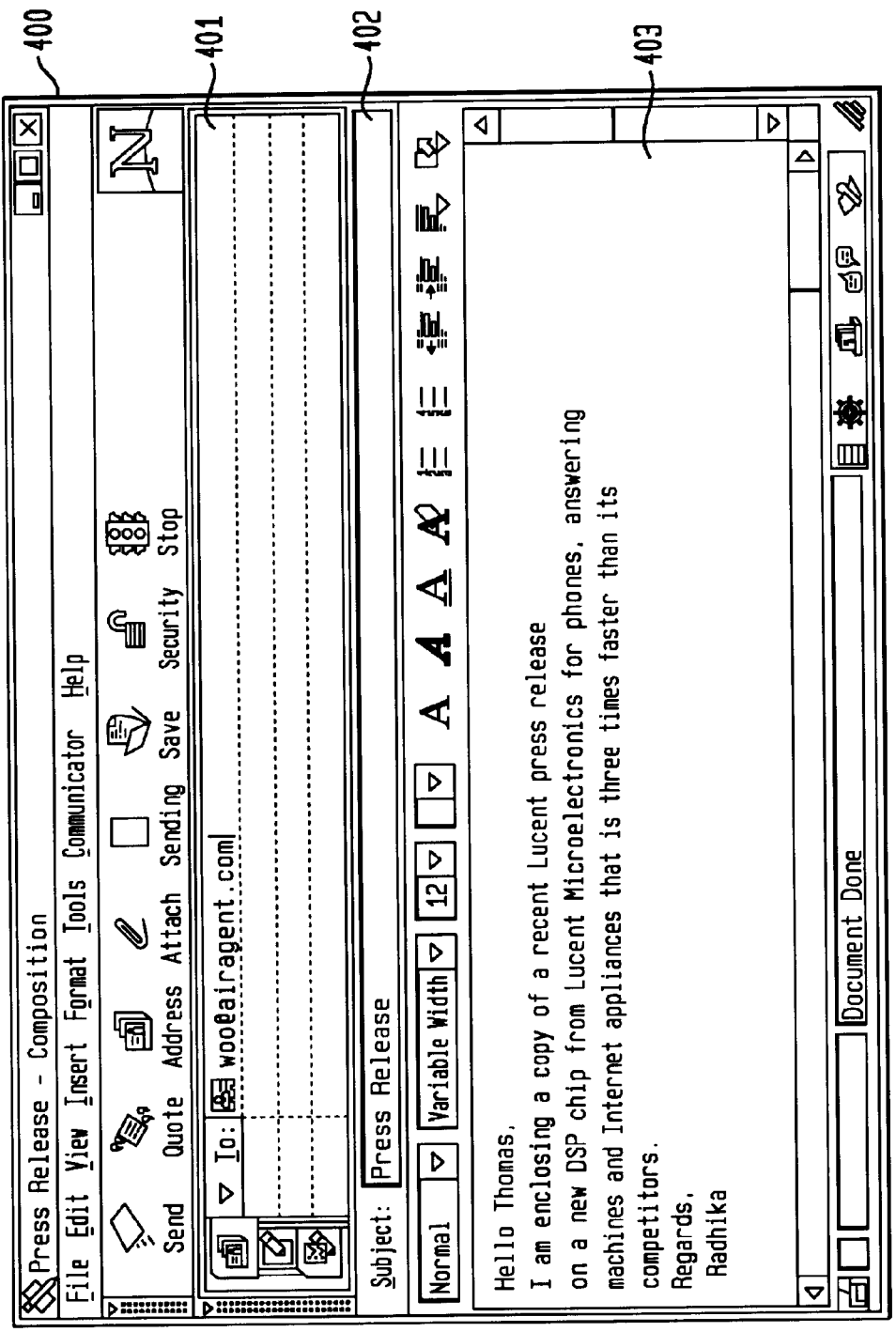
FIG. 4(a)–(t) shows an e-mail service scenario according to the present invention.
Figure 4B:
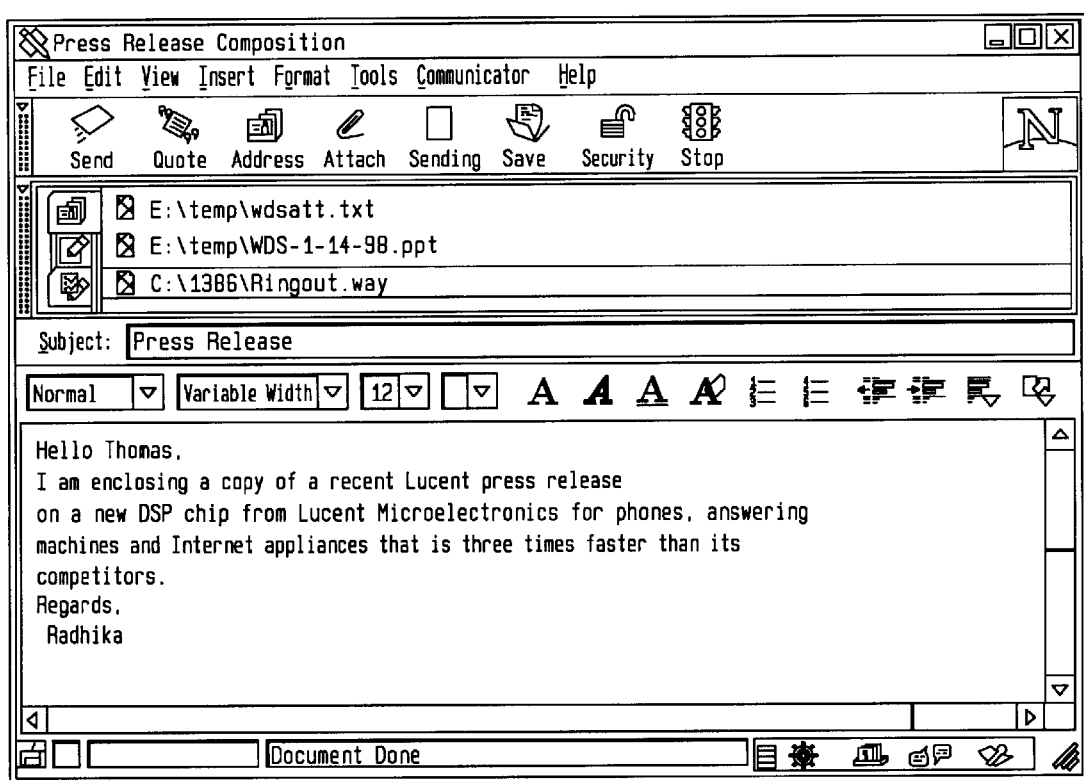
Figure 4C:
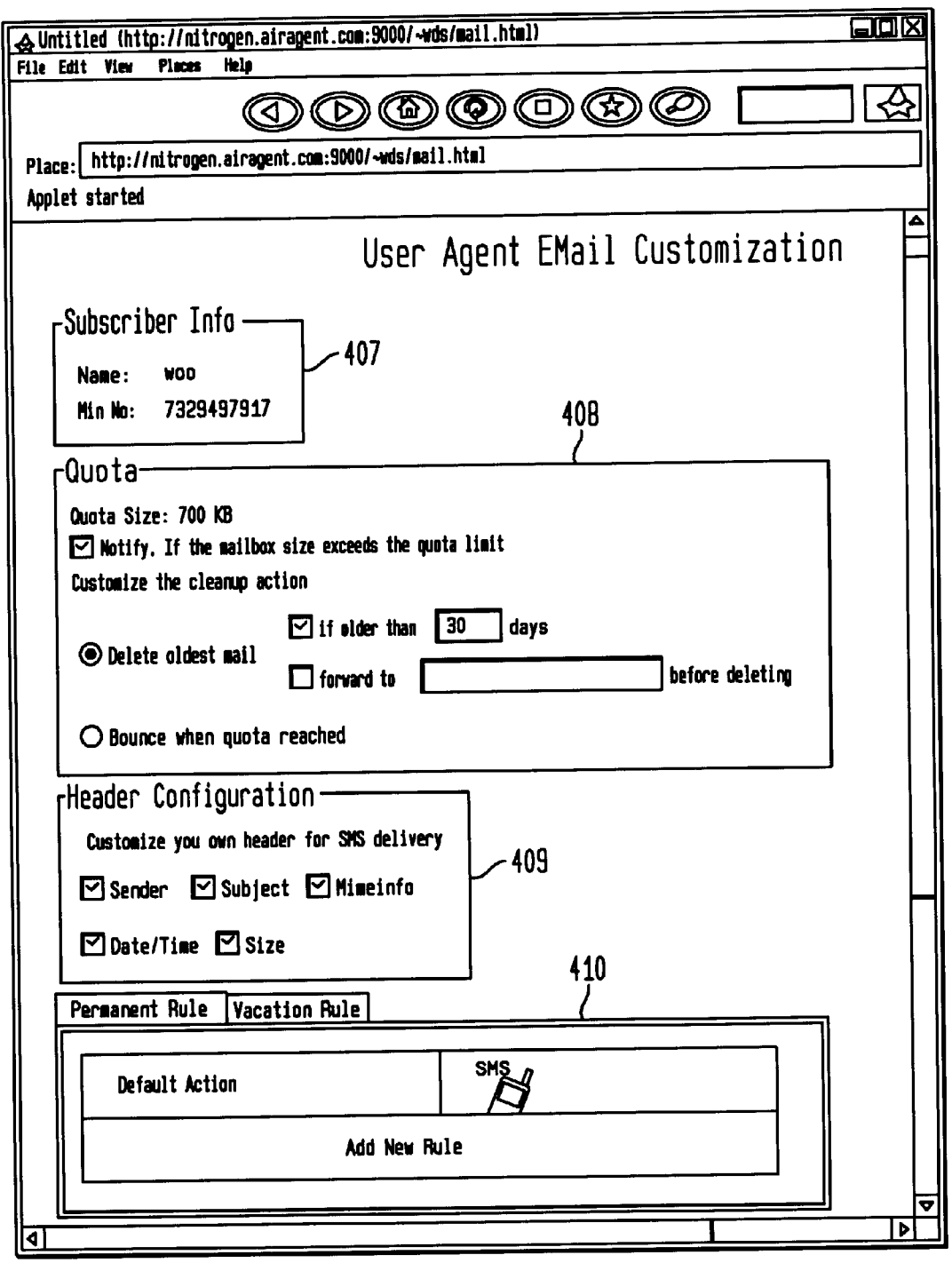
Figure 4D:
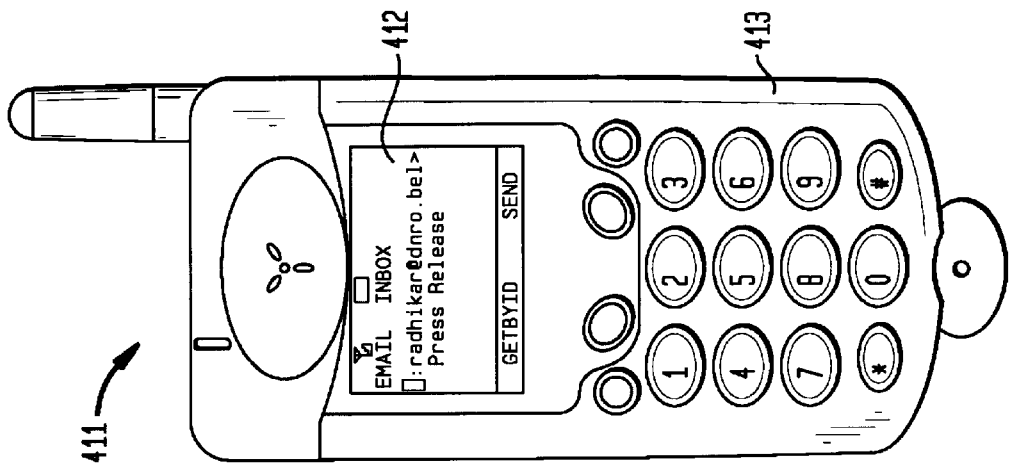
Figure 4E:
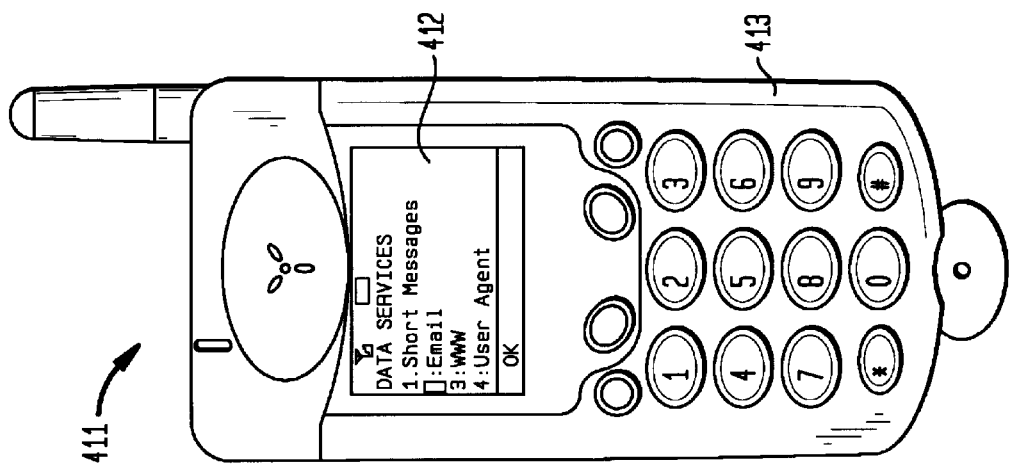
Figure 4F:
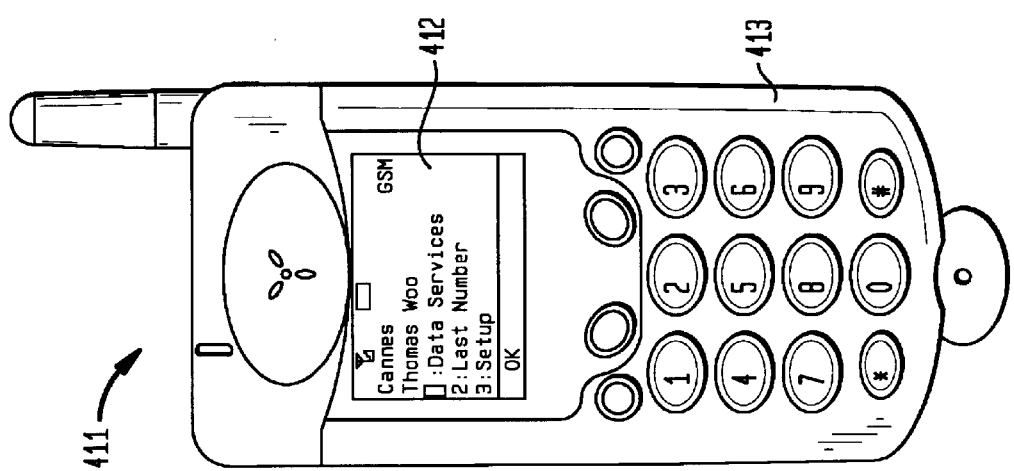
Figure 4I:
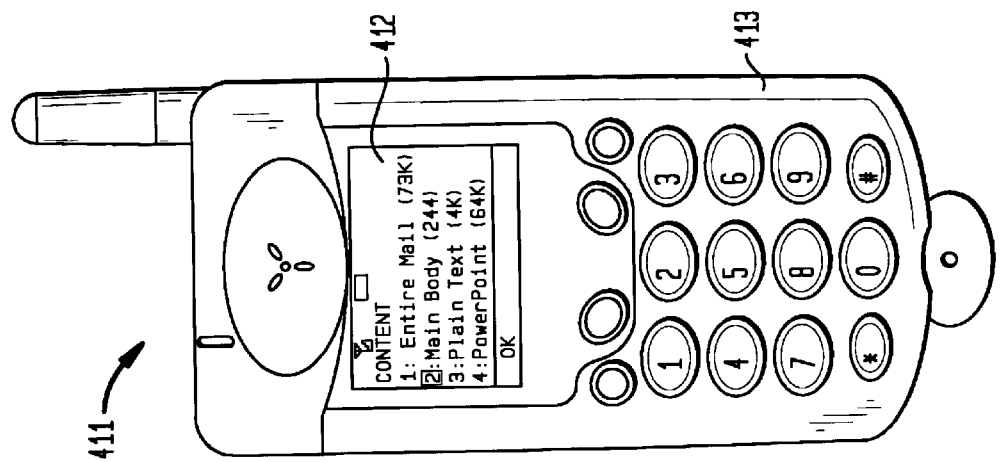
Figure 4H:
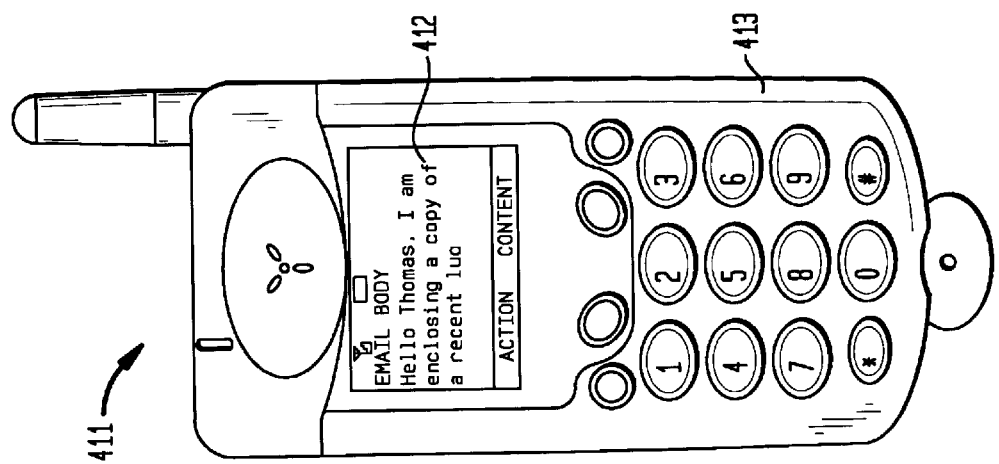
Figure 4G:
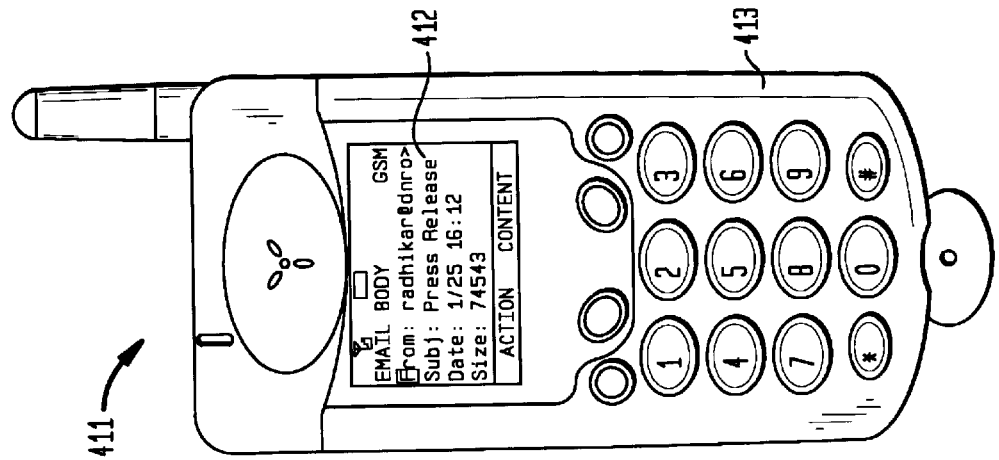
Figure 4L:
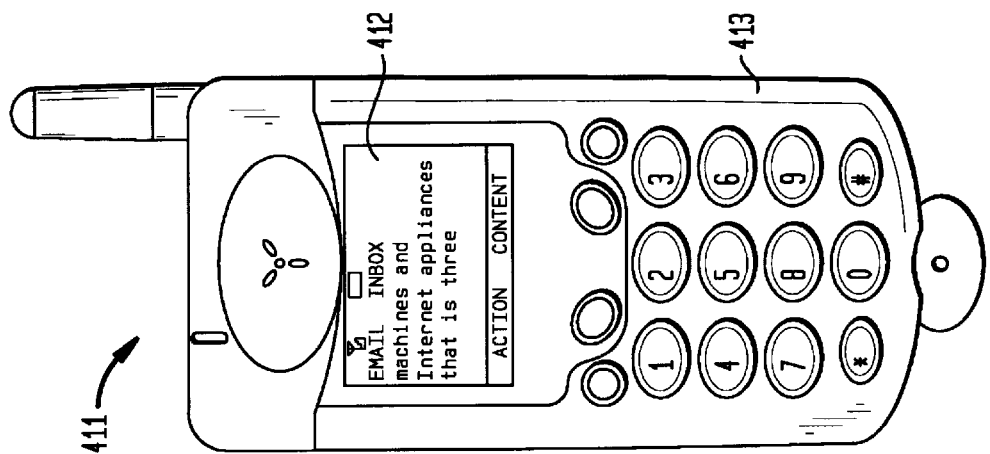
Figure 4K:
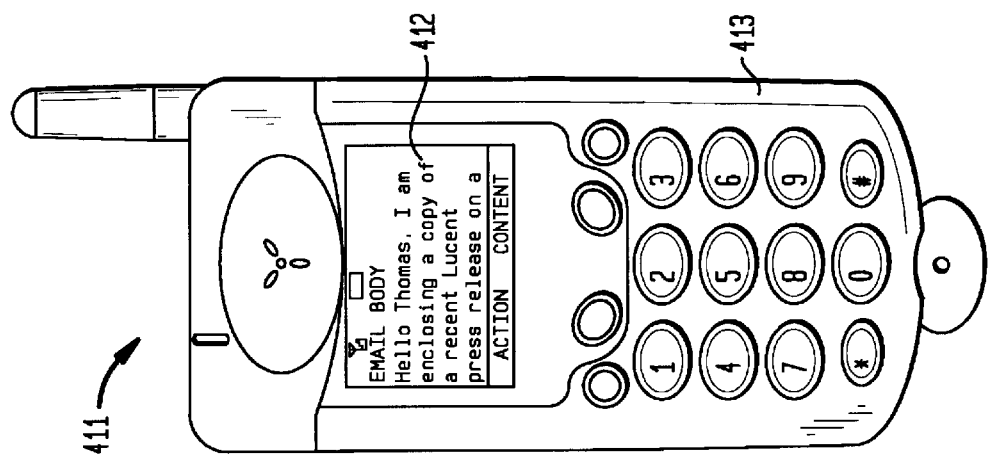
Figure 4J:
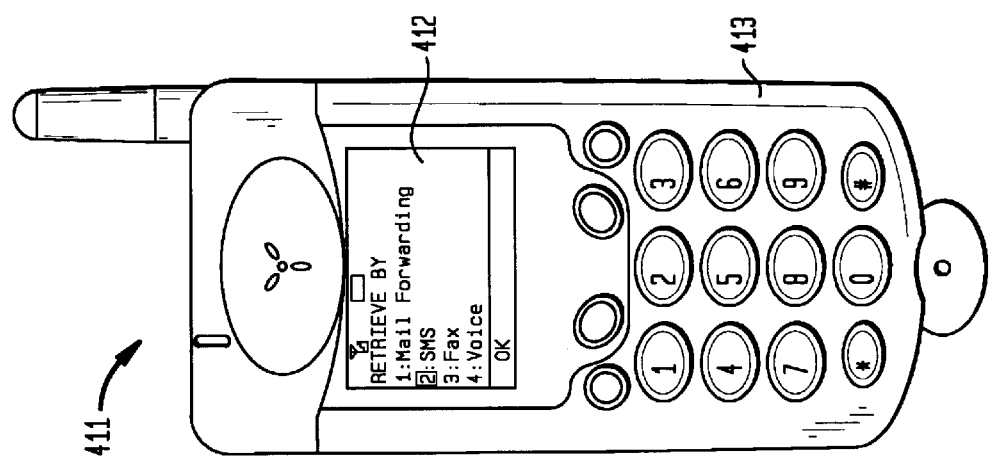
Figure 4O:
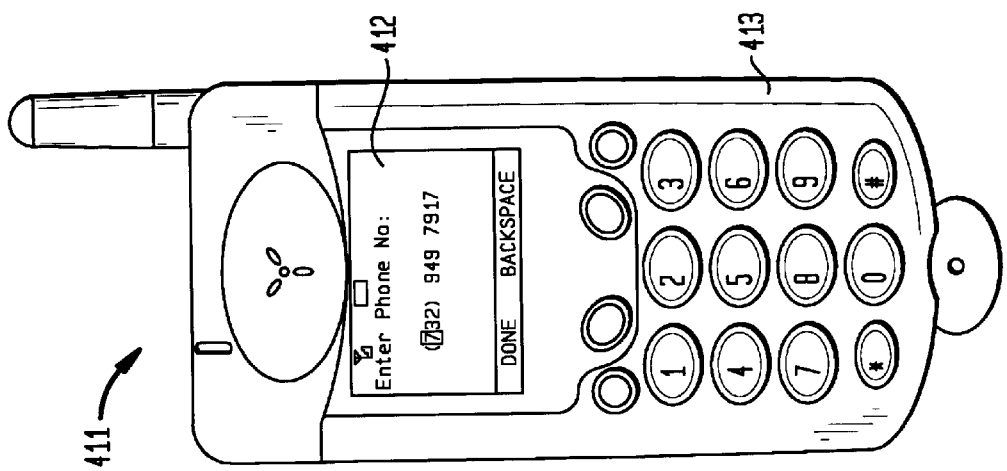
Figure 4N:
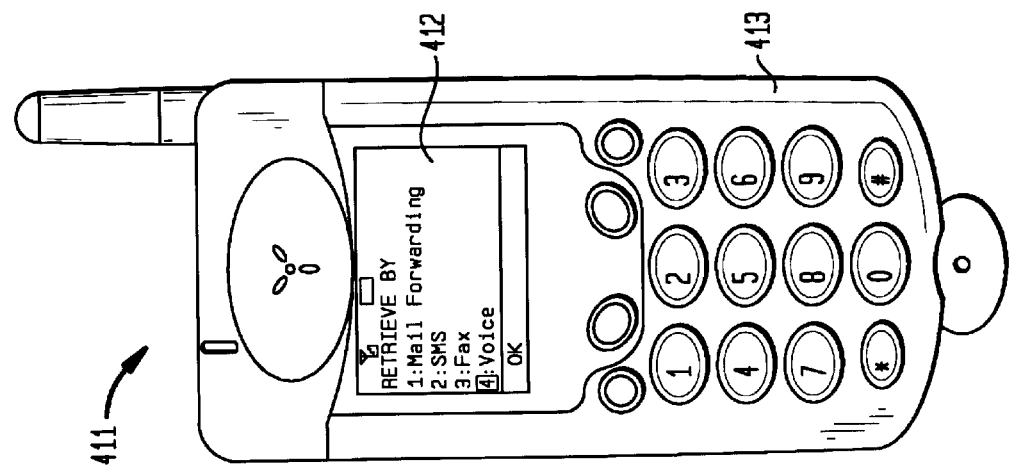
Figure 4M:
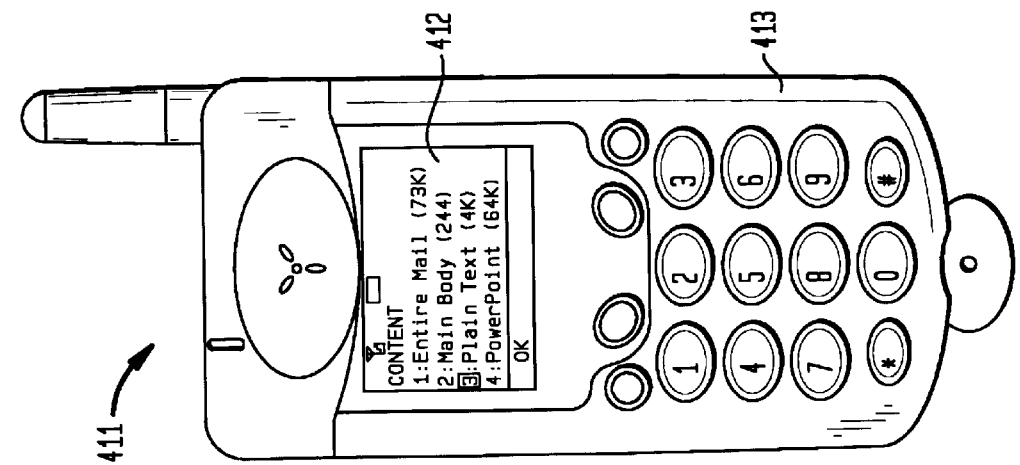
Figure 4R:
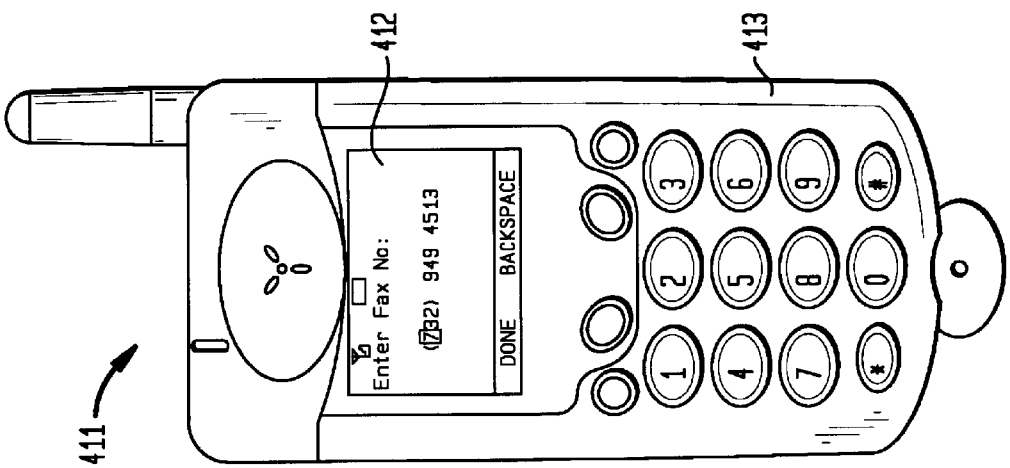
Figure 4Q:
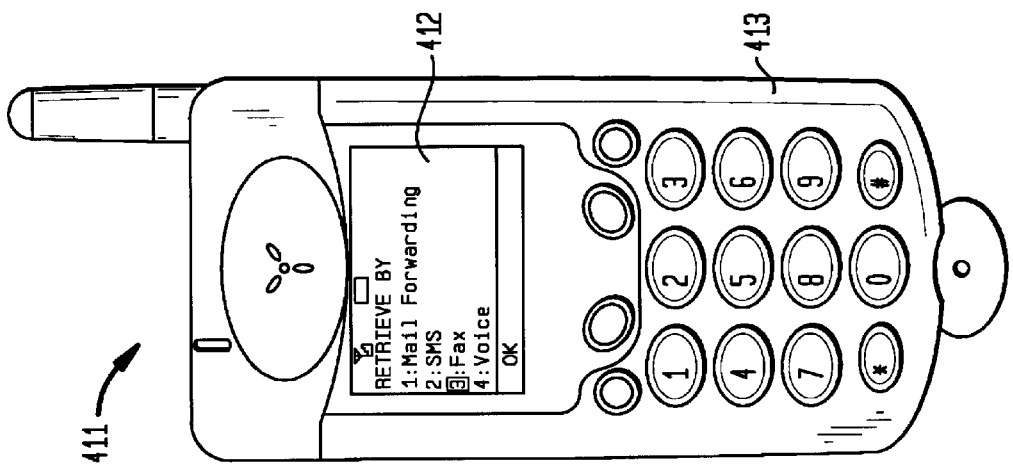
Figure 4P:
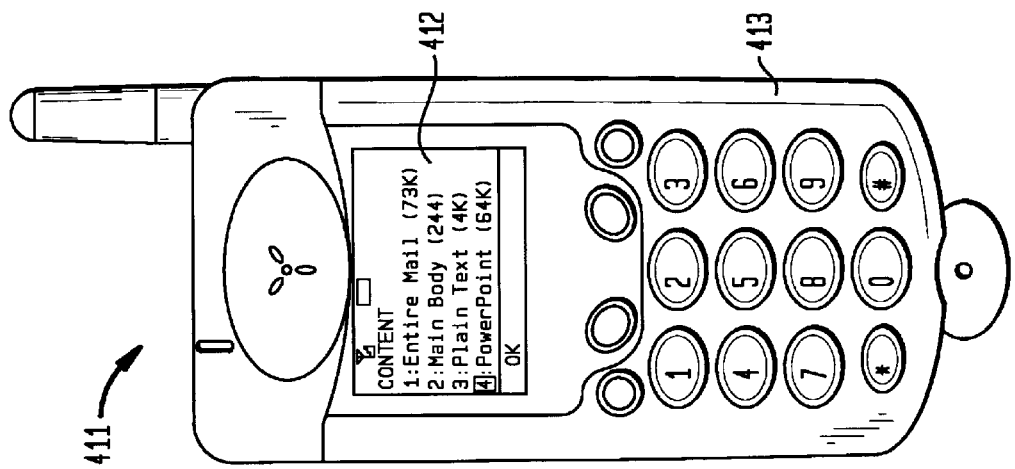

In the last of our exemplary scenarios, Radhika accesses the World-Wide-Web (WWW) to retrieve a current stock quote. The sequence of this scenario is shown in FIG. 4(a)–(t).

With reference now to FIG. 12(a), there is once-again shown Radhika's handset. Since she wants to use the WWW, and WWW services fall under Data Services, she selects Data Services from the display menu by depressing the number 1 on the numeric keypad. Subsequently, the selects the WWW choice as shown in FIG. 12(b) by depressing the number 3 on the numeric keypad.

Turning our attention now to FIG. 12(c), the WWW inbox is shown in the display of her handset 411. The inbox is where all WWW replies are collected. Since there has not been any previous WWW requests, her inbox is empty. To initiate a new WWW request, Radhika depresses the SEND key.

Figure 12F:
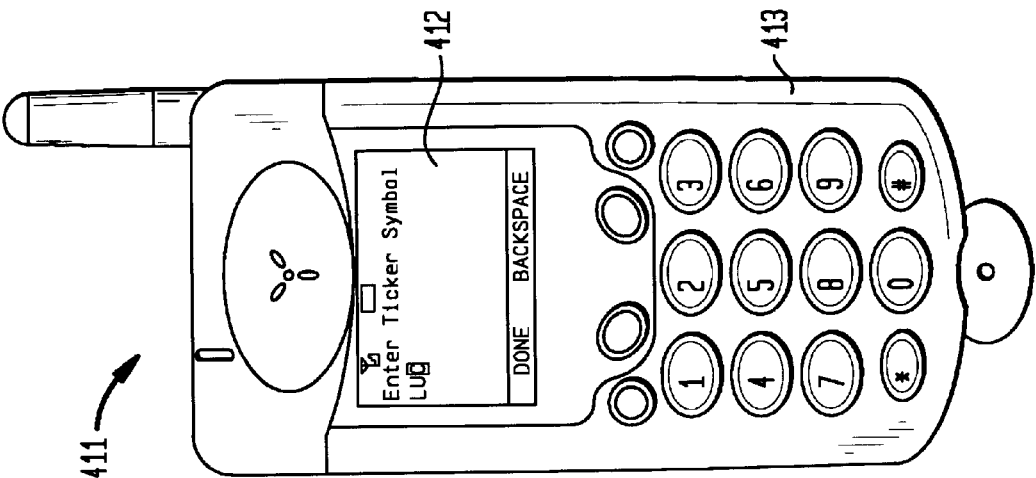
Figure 12E:
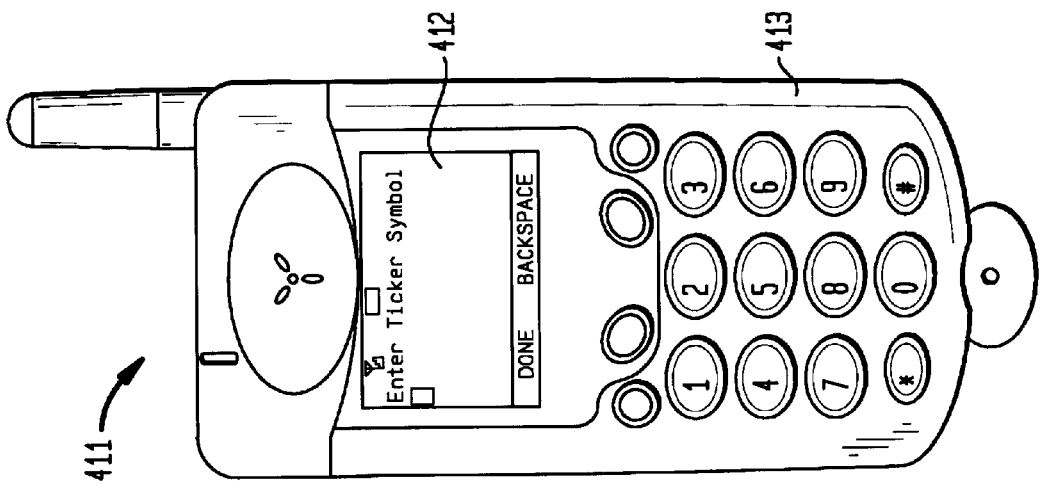
Figure 12D:
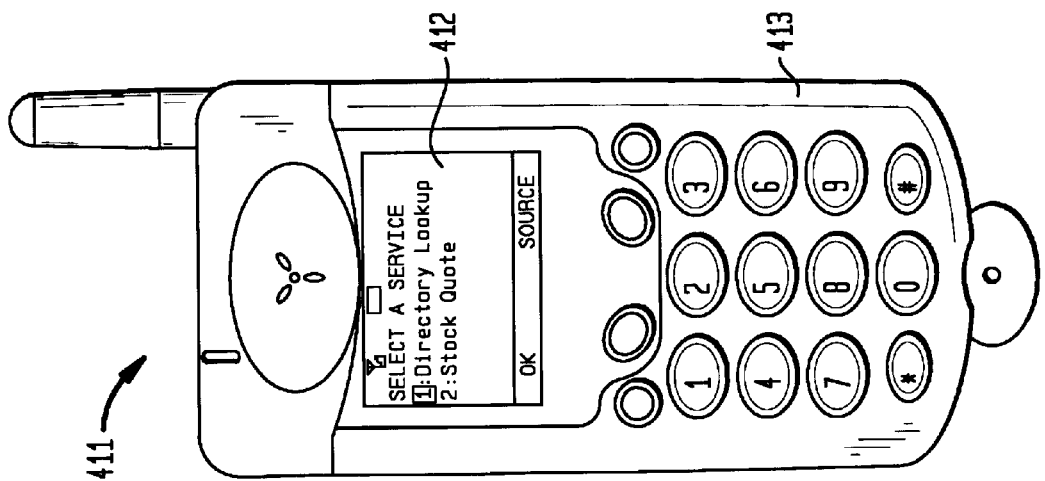

Since Radhika has subscribed to two (2) WWW services, two services are listed in the display shown in FIG. 12(d). Specifically, the two services that she has subscribed to are "Directory Lookup" and "Stock Quotes", respectively. For the purposes of our exemplary service scenario, Stock Quote is selected by depressing 2 on the numeric keypad 413.

The stock quote service prompts the subscriber for one or more stock symbols for which to return quotes. As shown in FIG. 12(e), an "enter ticker symbol" prompt is displayed in the display. As can be readily appreciated, this prompting is the result of our inventive active messaging described previously.

FIG. 12(f) shows the display after Radhika enters the ticker symbol for the desired listed security. In this example, Radhika enters LU for Lucent Technologies, Inc. At this point the customization of the stock quote active message is now completed. The message may now be sent to the service controller. As with previous messages, the transmission is accomplished by depressing the OK softkey. The display corresponding to this completed message is shown in FIG. 12(g).

When a reply to the WWW stock quote request is returned to the handset, it notifies Radhika by emitting an audible beep. Alternative notification methods are known, such as vibrating or alternatively, flashing a display. As shown in FIG. 12(h), Radhika can browse the reply by viewing the WWW inbox. To do this, she first selects Data Services and then WWW, as before.

As shown in FIG. 12(i), the WWW inbox shows a synopsis of the WWW reply. To view it in detail, she depresses 1 on the numeric keypad. The detail of the received message is shown in FIG. 12(j). Scrolling down the display shows the remainder of the message. Finally, the Lucent quote is shown in FIG. 12(k).

Scenario Architecture

With the above scenarios described, it is now possible to describe our inventive service and apparatus in an architectural context. Specifically, and with reference now to FIG. 7, there is shown in block diagram form the service scenario for e-mail notification via SMS. As shown in the figure, e-mail 711 is received from internet 710 by service controller 713. Oftentimes, such a receipt will traverse through a "firewall" 712, which is a known device for selectively admitting such messages. Through the use of a firewall, potentially damaging messages originating from a hostile source, are prevented from entering the system.

E-mail such as that traversing the internet is typically communicated via known protocols, such as the Simple Mail Transfer Protocol (SMTP). SMTP gateway 714, serves to interface the SMTP mail messages with the service controller 713.

Once the mail is received by the service controller 713, it is handled according to filtering and forwarding rules 715 that are pre-established by a service subscriber, typically an individual for whom individual mail messages are addressed. As previously described, the filtering and forwarding rules are flexible, and permit the filtering and forwarding of mail messages in any manner capable of being specified as a rule. After the appropriate handling is determined, notification of the mail receipt may then be transmitted a subscriber handset 720, as appropriate.

Figure 7:
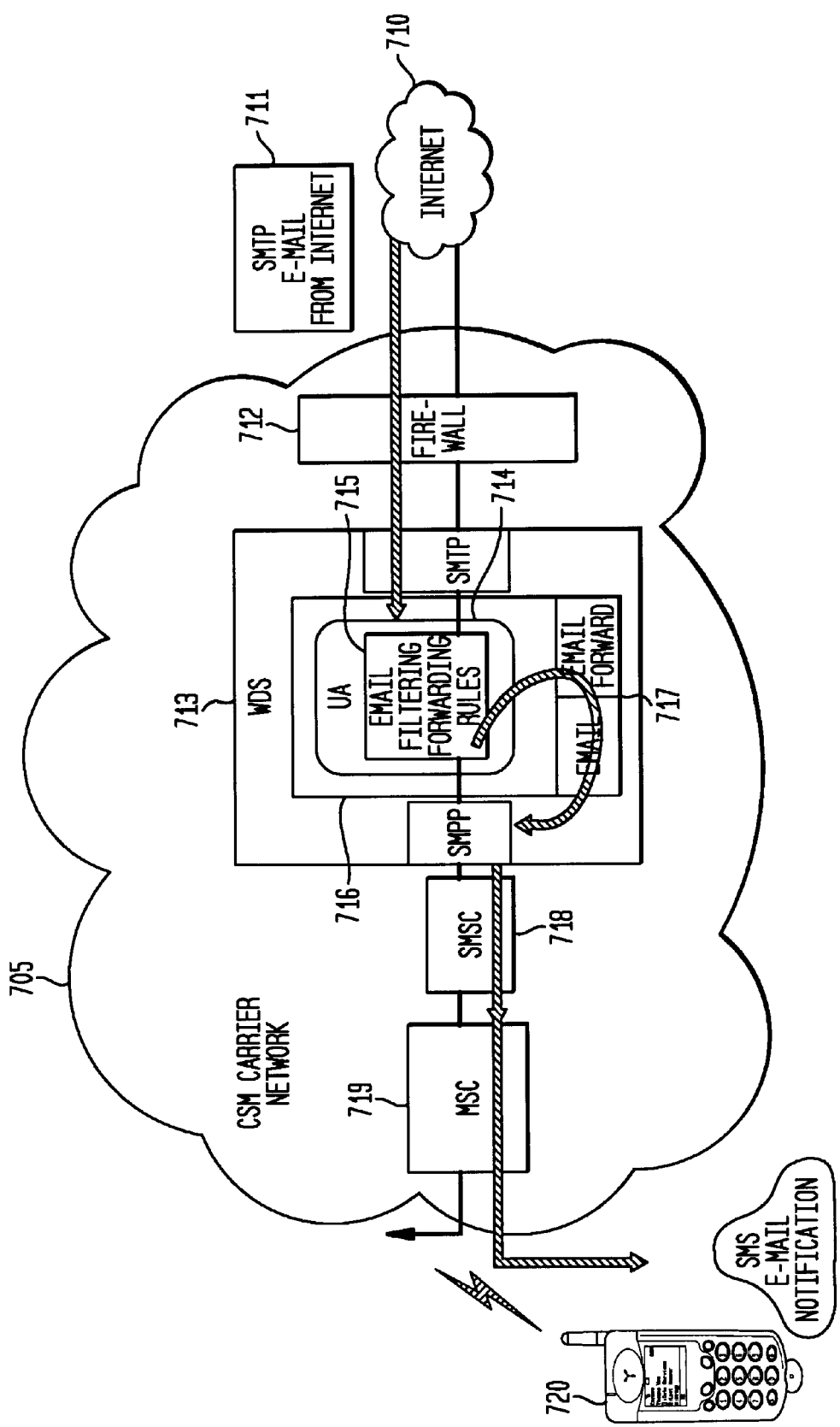
FIG. 7 shows a service scenario of e-mail notification via SMS according to the present invention.
Figure 8:
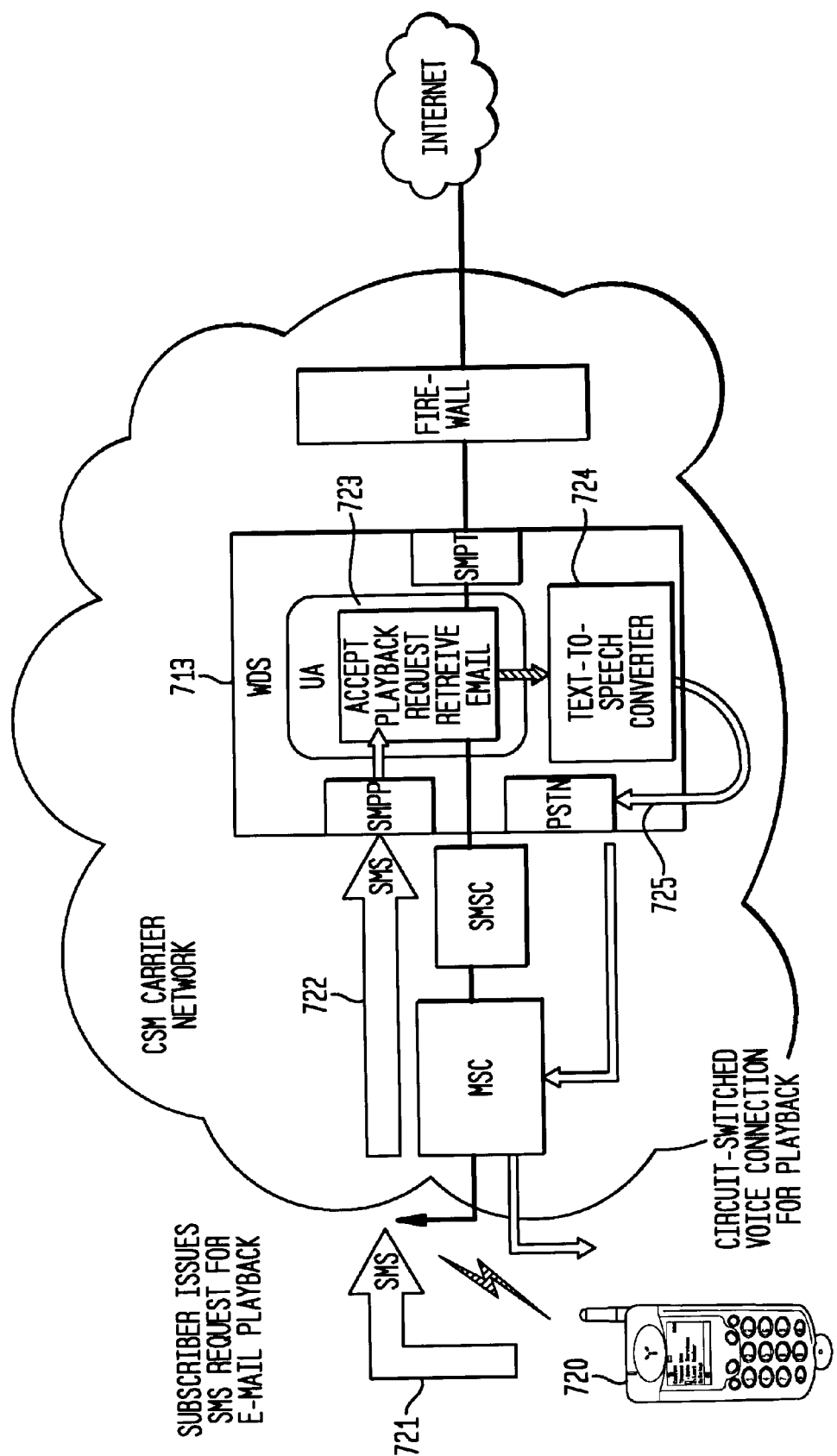
FIG. 8 shows a service scenario of on-demand e-mail speech playback according to the present invention.

FIG. 8 depicts the steps associated with on-demand e-mail speech playback of the e-mail message of FIG. 7. In particular, upon receipt of the e-mail notification, the subscriber issues an SMS request 721 for e-mail playback to his handset 720. The SMS message, in this example, is transported via carrier network (e.g., GSM) to service controller 713. The playback request is accepted, the e-mail is retrieved and subsequently passed to text-to-speech converter 724. The converted text is then transported via the public switched telephone network (PSTN) 725 over a circuit switched connection through the GSM carrier network and played on handset 720.

Figure 9:
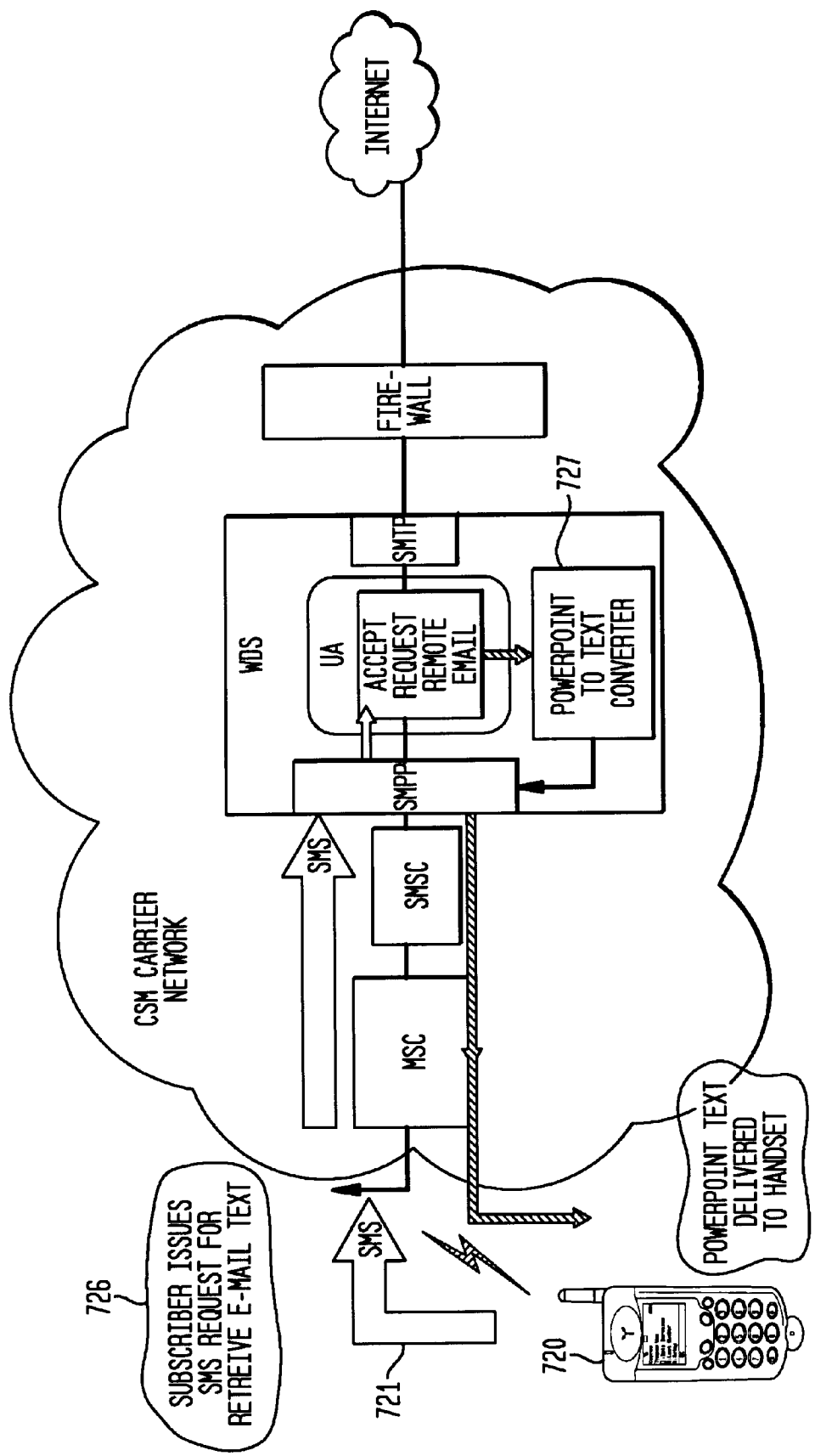
FIG. 9 shows a service scenario of e-mail attachment conversion according to the present invention.

Similarly, an e-mail having graphical attachments (e.g., Power-Point) may be converted by an additional converter prior to transmission to handset. With reference now to FIG. 9, there is shown the scenario when an e-mail includes a graphical attachment. Specifically, when a subscriber receives notification of an e-mail on handset 720, the subscriber will issue a request to retrieve the e-mail 726. Since the e-mail contains a graphical attachment, it is converted by converter 727 and the converted e-mail is sent via SMS protocols to handset 720.

Figure 10:
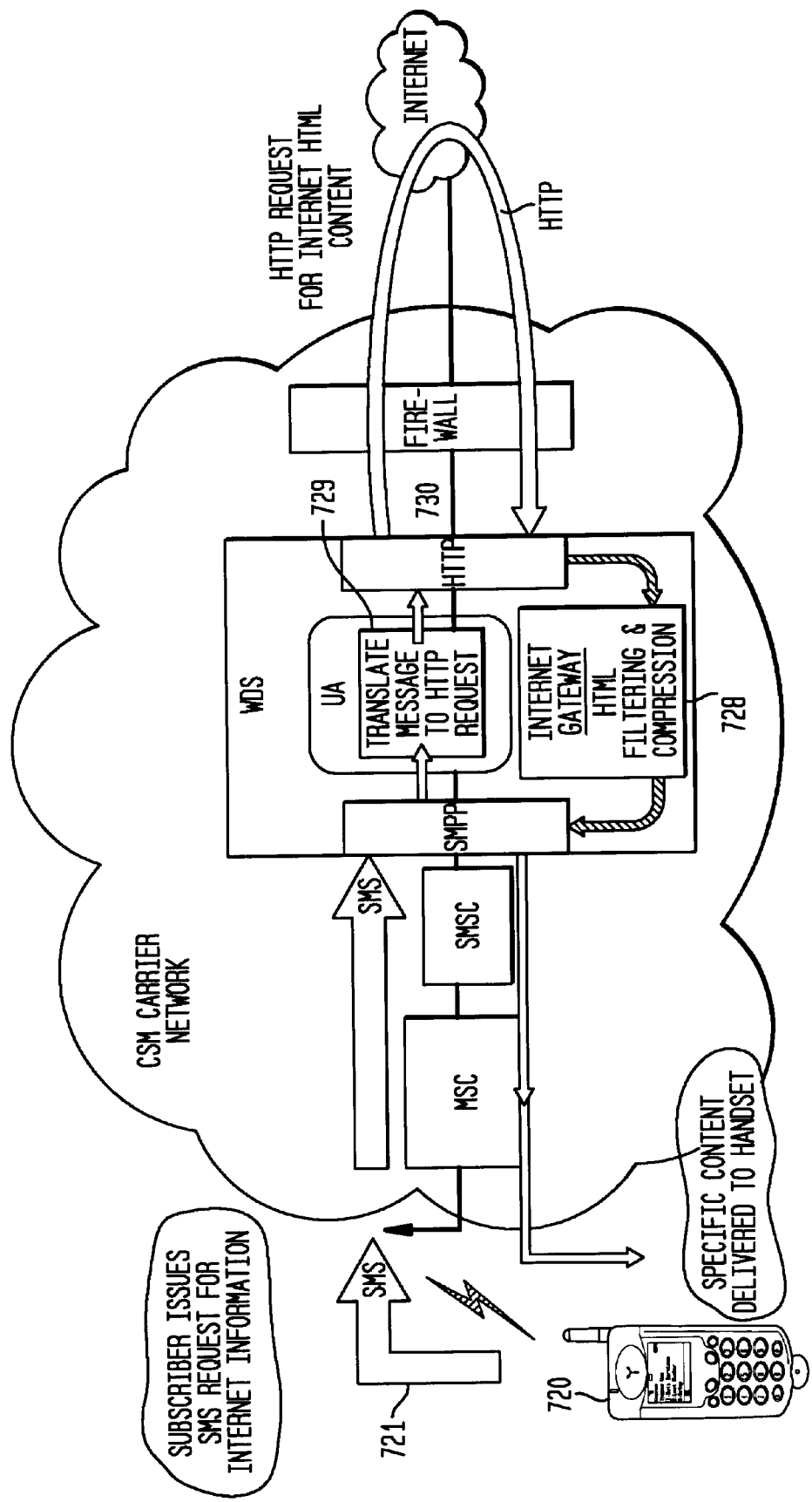
FIG. 10 shows a service scenario of on-demand internet access according to the present invention.
Figure 11:
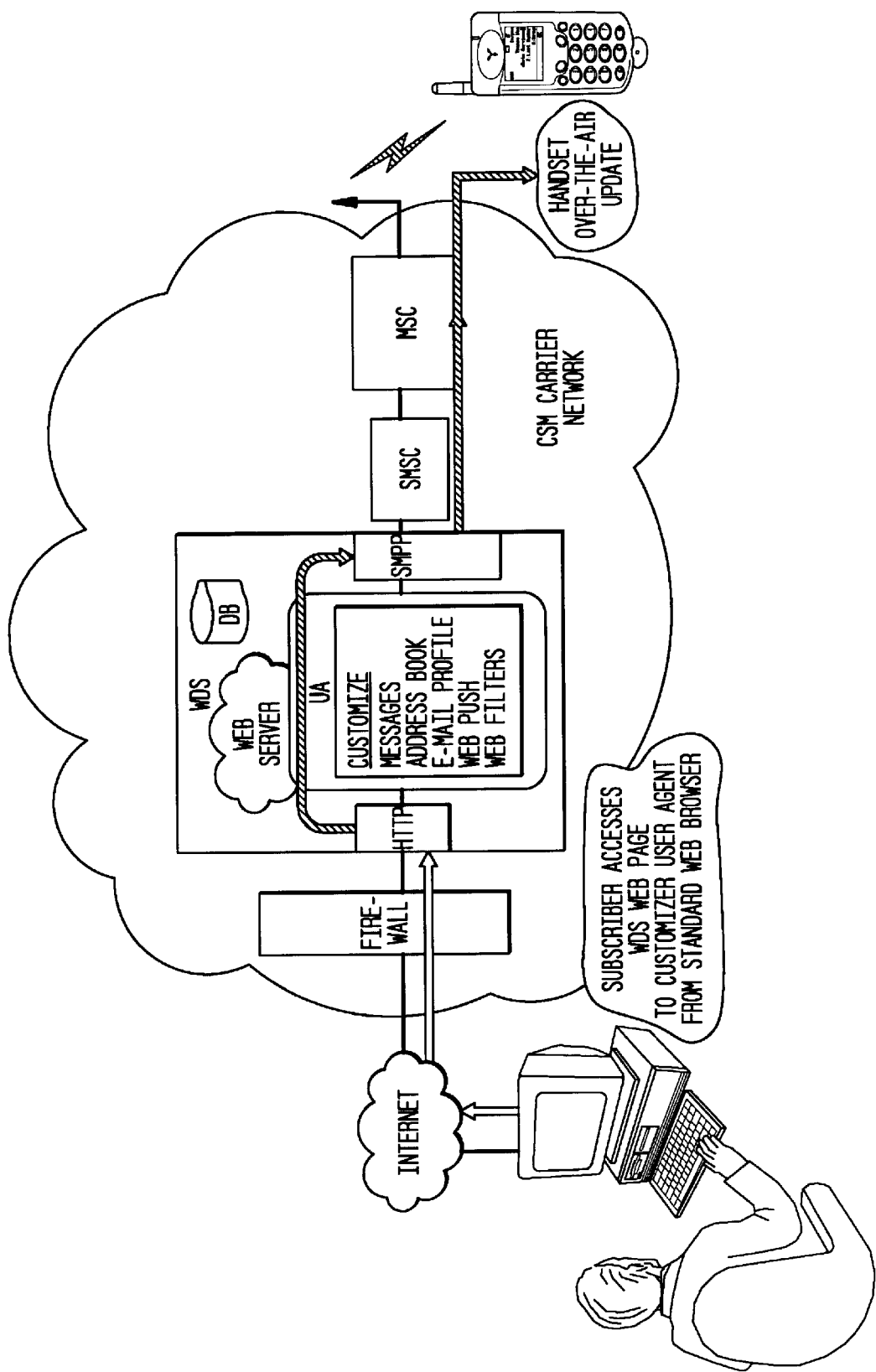
FIG. 11 shows user agent customization according to the present invention.

Additionally, our inventive service and apparatus permits a subscriber to access the internet or a private intranet as required. Shown diagrammatically in FIG. 10, are the steps for such access. Specifically, the subscriber uses handset 720 to issue SMS request for internet information. This request, as with the others previously described, may advantageously be carried over a GSM carrier network via standard SMS protocols. The message is received by the service controller and translated from SMS format into a hypertext transport protocol HTTP request by translator situated within service controller. The HTTP request is then routed to the internet for internet/intranet content as appropriate. In response to this request, HTTP message is returned from internet to service controller and is received by internet gateway 728 which provides HTML filtering and/or compression as needed. The filtered message is then converted to SMS protocol, where it is delivered to handset 720 via carrier network. Of course, those skilled in the art will readily appreciate that the particular protocols and transport used in these examples are only exemplary, and a variety of known substitutions for each are easily envisioned and implemented as required.

Recall that our inventive service and apparatus permits the use of user/subscriber-specific agent that provides individualized messaging, addressing, e-mail profile, filters, etc. Advantageously, such agent profile characteristics are established/customized through well-known, WWW protocols and methods. For example, a user of our service accesses a service controller web page to customize his/her user agent from a standard web browser. As can be appreciated, this greatly facilitates the ease with which a subscriber may uniquely tailor his/her service.

While the invention has been shown and described in detail in the context of a preferred embodiment, it will be apparent to those skilled in the art that variations and modifications are possible without departing from the broad principles and spirit of the invention which should be limited solely by the scope of the claims appended hereto.

The claimed invention is:

1. A method for providing a wireless messaging communications service, the method comprising:
   receiving an electronic mail transmission addressed to a subscriber of said service;
   determining a method for notifying said subscriber of said electronic mail transmission, said method having been specified by said subscriber via a user-specific agent comprising a user profile and a set of commands, said commands being customizable by said subscriber and comprising a command for creating a shortcut rule and a command for utilizing a subset of said set of commands to filter said electronic mail transmission;
   notifying said subscriber of said electronic mail transmission via said method specified by said subscriber;
   receiving from said subscriber instructions for delivering said electronic mail transmission; and
   delivering said electronic mail transmission in accordance with said subscriber's instructions.

2. The method according to claim 1 further comprising:
   converting said electronic mail transmission to an appropriate format in accordance With said subscriber's deliver instructions.

3. The method according to claim 2, wherein said act of converting comprises converting a textual message to speech.

4. The method according to claim 1, wherein said act of notifying comprises sending a short message service notification to said subscriber.

5. The method according to claim 1, wherein said electronic mail transmission is received from the Internet.

6. The method according to claim 1, wherein said electronic mail transmission is received from an Intranet.

7. The method according to claim 1, wherein said electronic mail transmission contains a plurality of components.

8. The method according to claim 7, wherein at least one of said plurality of components comprises a graphical attachment.

9. The method according to claim 7, wherein at least one of said plurality of components comprises a multi-media attachment.

10. The method according to claim 1, wherein said act of receiving from said subscriber comprises receiving from said subscriber instructions to deliver said electronic mail transmission via facsimile.

11. The method according to claim 1, wherein said act of notifying comprises providing said subscriber with at least a description of the electronic mail transmission.

12. The method according to claim 11, wherein said act of providing comprises providing at least one of a sender's name, a sender's e-mail address, a date, a subject, a size, attachment information and a portion of a body of the electronic mail transmission.

13. The method according to claim 1, wherein said act of determining comprises determining said method from a set of rules specified by said subscriber, said rules governing how to proceed upon receipt of an electronic mail transmission addressed to said user.

14. The method according to claim 1, wherein said act of notifying comprises causing an audible tone at a subscriber's wireless handset.

15. The method according to claim 1, wherein said act of notifying comprises causing a mechanical vibration of a subscriber's wireless handset.

16. The method according to claim 1, wherein said act of notifying comprises sending a voice message to a subscriber's wireless handset.

17. The method according to claim 1, wherein said act of notifying comprises sending a facsimile to said subscriber.

18. A method for providing a wireless messaging communications service, the method comprising:

receiving an electronic mail transmission addressed to a subscriber of the service, said electronic mail transmission having a plurality of components;

notifying said subscriber of said electronic mail transmission;

receiving from said subscriber delivery instructions for each of said plurality of components of said electronic mail transmission; and delivering each of said plurality of components as instructed by said subscriber.

19. The method according to claim 18 further comprising converting each component of said electronic mail transmission to an appropriate format in accordance with said subscriber's delivery instructions.

20. The method according to claim 19, wherein said act of converting comprises converting at least one component from text to speech.

21. The method according to claim 19, wherein said act of converting comprises converting at least one component from a graphical format to a format for transmission via facsimile.

22. The method according to claim 19, wherein said act of converting comprises converting at least one component from an audio format to speech.

23. The method according to claim 18, wherein said act of notifying comprises sending a short message service notification to said subscriber.

24. The method according to claim 18, wherein said act of receiving an electronic mail comprises receiving said electronic mail transmission from the Internet.

25. The method according to claim 18, wherein said act of receiving an electronic mail comprises receiving said electronic mail transmission from an Intranet.

26. The method according to claim 18, wherein said act of notifying comprises providing said subscriber with at least a description of the electronic mail transmission.

27. The method according to claim 26, wherein said act of providing comprises providing at least one of a sender's name, a sender's e-mail address, a date, a subject, a size, attachment information and a portion of a body of the electronic mail transmission.

28. A system for providing a wireless messaging communications service, the system comprising:

means for receiving an electronic mail transmission addressed to a subscriber of said service, said electronic mail transmission comprising at least two differently formatted components;

means for determining a method for notifying said subscriber of said electronic mail transmission, said method having been specified by said subscriber via a user-specific agent;

means for notifying said subscriber of said electronic mail transmission via said method specified by said subscriber;

means for receiving from said subscriber instructions for delivering said at least two differently formatted components of said electronic mail transmission; and means for delivering said at least two differently formatted components of said electronic mail transmission in accordance with said subscriber's instructions.

29. The system according to claim 28 further comprising means for converting said electronic mail transmission to an appropriate format in accordance with said subscriber's delivery instructions.

30. The system according to claim 29, wherein said means for converting further comprises means for converting a textual message to speech.

31. The system according to claim 28, wherein said means for notifying comprises means for sending a short message service notification to said subscriber.

* * * * *